United States Patent
Seo et al.

(10) Patent No.: US 11,038,419 B2
(45) Date of Patent: Jun. 15, 2021

(54) CHARGE PUMP DEVICE AND IMAGE SENSOR INCLUDING THE SAME

(71) Applicant: SAMSUNG ELECTRONICS CO., LTD., Suwon-si (KR)

(72) Inventors: Minwoong Seo, Hwaseong-si (KR); Dongmo Im, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/032,808

(22) Filed: Sep. 25, 2020

(65) Prior Publication Data
US 2021/0013801 A1 Jan. 14, 2021

Related U.S. Application Data

(63) Continuation of application No. 16/822,207, filed on Mar. 18, 2020, now Pat. No. 10,826,389.

(30) Foreign Application Priority Data

May 28, 2019 (KR) .................. 10-2019-0062788
Nov. 14, 2019 (KR) .................. 10-2019-0146183

(51) Int. Cl.
 H02M 3/07 (2006.01)
 H04N 5/361 (2011.01)
(52) U.S. Cl.
 CPC .......... *H02M 3/073* (2013.01); *H04N 5/361* (2013.01)
(58) Field of Classification Search
 None
 See application file for complete search history.

(56) References Cited

U.S. PATENT DOCUMENTS

| | | | |
|---|---|---|---|
| 5,892,267 A | 4/1999 | Takada | |
| 5,973,979 A | 10/1999 | Chang et al. | |
| 6,175,264 B1 | 1/2001 | Jinbo | |
| 6,696,883 B1 | 2/2004 | Wilson | |
| 6,734,475 B2 | 5/2004 | Myono et al. | |
| 6,831,499 B2 | 12/2004 | Oddone et al. | |
| 6,914,791 B1 | 7/2005 | Park et al. | |
| 7,190,211 B2 | 3/2007 | Nakagawa et al. | |
| 7,323,926 B2 | 1/2008 | Chen et al. | |
| 8,736,351 B2 | 5/2014 | Yang et al. | |
| 9,379,149 B2 * | 6/2016 | Yamashita | ........ H01L 27/14636 |
| 9,825,526 B2 | 11/2017 | Watanabe | |
| 2005/0077950 A1 | 4/2005 | Robinson, Jr. | |
| 2006/0273843 A1 | 12/2006 | Daga et al. | |
| 2007/0069800 A1 | 3/2007 | Shih et al. | |

OTHER PUBLICATIONS

Co-pending U.S. Appl. No. 16/822,207, filed Mar. 18, 2020.

* cited by examiner

*Primary Examiner* — Jeffery S Zweizig
(74) *Attorney, Agent, or Firm* — F. Chau & Associates, LLC

(57) ABSTRACT

A charge pump device is configured to generate an output voltage from a square wave, where the charge pump device includes a semiconductor layer; first and second outer wells; a first inner well formed in the first outer well; a second inner well formed in the second outer well; a first capacitor, to which the input signal is applied, and connected to the first outer well; and a second capacitor connected to the first capacitor and second outer well, wherein the first voltage is applied to the first outer well, and a voltage that is lower than the first voltage is applied to the second outer well.

20 Claims, 23 Drawing Sheets

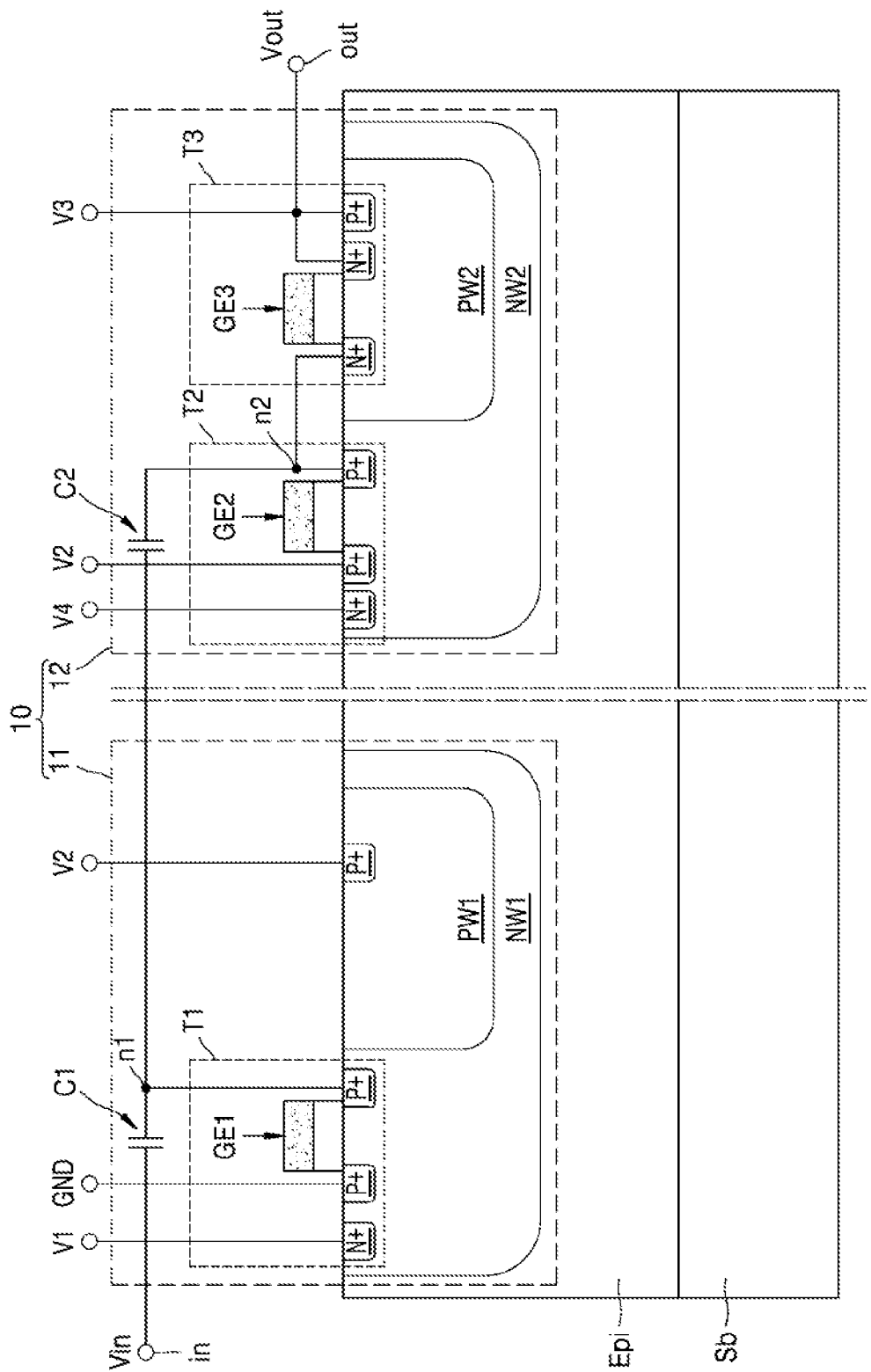

CHARGE PUMP DEVICE AND IMAGE SENSOR INCLUDING THE SAME

CROSS-REFERENCE TO RELATED APPLICATIONS

This U.S. non-provisional patent application is a continuation of co-pending U.S. patent application Ser. No. 16/822,207, titled CHARGE PUMP DEVICE AND IMAGE SENSOR INCLUDING THE SAME and filed on Mar. 18, 2020, which, in turn, claims priority under 35 U.S.C. § 119 to Korean Patent Application No. 10-2019-0062788, filed on May 28, 2019 in the Korean Intellectual Property Office, and Korean Patent Application No. 10-2019-0146183, filed on Nov. 14, 2019 in the Korean Intellectual Property Office, the disclosures of which are incorporated by reference herein in their entireties.

TECHNICAL FIELD

The present disclosure relates to a charge pump device and an image sensor including the same; and more particularly relates to a multi-stage charge pump and image sensor having wells of a same conductivity type coupled to different charge pump potentials.

DISCUSSION OF THE RELATED ART

Image sensors are semiconductor-based sensors that receive light and generate an electrical signal. Image sensors may each include a pixel array including a plurality of pixels and a circuit that drives the pixel array. Image sensors may be applied to cameras that capture still images or moving images, and are broadly applied to smart phones, tablet personal computers (PCs), laptop computers, televisions (TVs), and the like. With an increasing demand for improved performance of a camera apparatus, research has been conducted into improving dark current characteristics of an image sensor.

SUMMARY

The present disclosure provides a charge pump device for outputting a negative voltage having a greater absolute value than an input voltage. The present disclosure shall not be limited to what is mentioned above, but may be more clearly understood by those of ordinary skill in the pertinent art from the descriptions set forth herein.

According to an aspect of the present disclosure, there is provided a charge pump device configured to generate an output voltage from an input signal, which may be a substantially square wave changing or alternating between a first voltage and a ground voltage.

The charge pump device includes a semiconductor layer of a first conductivity type; a first outer well and a second outer well that are separated from each other in the semiconductor layer and are of a second conductivity type; a first inner well formed in the first outer well and being of the first conductivity type; a second inner well formed in the second outer well and being of the first conductivity type; a first capacitor having a first terminal, to which the input signal is applied, and a second terminal connected to the first outer well; and a second capacitor having a first terminal connected to the first capacitor and a second terminal connected to the second outer well, wherein the first voltage may be applied to the first outer well, and a voltage that is lower than the first voltage may be applied to the second outer well.

According to another aspect of the present disclosure, there is provided a charge pump device configured to output a voltage that is lower than a ground voltage to an output terminal using an input signal that alternately provides the ground voltage and a first voltage that is higher than the ground voltage. The charge pump device includes a first stage including a first capacitor and a first transistor, the first capacitor having a first terminal, to which the input signal is applied, and the first transistor being connected to a second terminal of the first capacitor; and a second stage including a second capacitor and a second transistor, the second capacitor having a first terminal connected to the second terminal of the first capacitor, and the second transistor being connected to a second terminal of the second capacitor, wherein the first transistor may include a gate electrode, to which the ground voltage and a second voltage that is lower than the ground voltage are alternately applied, and the second transistor may include a gate electrode, to which the second voltage and a third voltage that is lower than the ground voltage are alternately applied.

According to another aspect of the present disclosure, there is provided a charge pump device configured to generate an output voltage using an input signal that alternately provides a first voltage and a ground voltage. The charge pump device includes a first stage including a first capacitor and a first transistor, the first capacitor having a first terminal, to which the input signal is applied, and the first transistor being connected to a second terminal of the first capacitor; and a second stage including a second capacitor and a second transistor, the second capacitor having a first terminal connected to the second terminal of the first capacitor, and the second transistor being connected to a second terminal of the second capacitor, wherein the first transistor may include a body, to which the first voltage is applied, and the second transistor may include a body, to which the ground voltage is applied.

According to yet another aspect of the present disclosure, there is provided an image sensor including a plurality of pixels formed in a semiconductor layer of a first conductivity type and arranged in a matrix; an isolation film arranged at a same level as the semiconductor layer and configured to isolate the plurality of pixels from one another; a timing generator configured to generate an input signal that provides a first voltage and a ground voltage; and a charge pump device configured to provide an output voltage to the isolation film using the input signal, wherein the charge pump device may include a first outer well and a second outer well each formed in the semiconductor layer and being of a second conductivity type; a first inner well formed in the first outer well and being of the first conductivity type; and a second inner well formed in the second outer well and being of the first conductivity type, a second voltage that is lower than the ground voltage is applied to the first inner well, a third voltage that is lower than the second voltage may be applied to the second inner well, and the output voltage may be substantially equal to the third voltage.

According to still another aspect of the present disclosure, there is provided an image sensor including a plurality of pixels formed in a semiconductor layer of a first conductivity type and arranged in a matrix; an isolation film arranged at a same level as the semiconductor layer and configured to isolate the plurality of pixels from one another; a timing generator configured to generate an input signal that provides a first voltage and a ground voltage; and a charge pump device configured to provide an output voltage to the isolation film using the input signal, wherein the charge pump device includes a first outer well and a second outer well each formed in the semiconductor layer and being of a second conductivity type; a first inner well formed in the first outer well and being of the first conductivity type; and a second inner well formed in the second outer well and being of the first conductivity type, wherein a second voltage that is lower than the ground voltage is applied to the first inner well, a third voltage that is lower than the second voltage is applied to the second inner well, and the output voltage is substantially equal to the third voltage.

According to a further aspect of the present disclosure, a semiconductor device is provided, including a semiconductor layer of a first conductivity type; an isolation film arranged at a same level as the semiconductor layer; a timing generator configured to generate an input signal having a first voltage and a ground voltage; and a charge pump configured to provide an output voltage to the isolation film based on the input signal, the charge pump comprising a first outer well and a second outer well each formed in the semiconductor layer and being of a second conductivity type, a first inner well formed in the first outer well and being of the first conductivity type, and a second inner well formed in the second outer well and being of the first conductivity type, wherein a second voltage that is lower than the ground voltage is applied to the first inner well, wherein a third voltage that is lower than the second voltage is applied to the second inner well, and wherein the output voltage is substantially equal to the third voltage.

BRIEF DESCRIPTION OF THE DRAWINGS

Embodiments of the present disclosure will be more clearly understood from the following detailed description when taken in conjunction with the accompanying drawings, in which.

DETAILED DESCRIPTION

In an exemplary embodiment, a multi-stage charge pump is configured to address dark current characteristics and prevent breakdown between at least an n-well and a pocket p-well in a complementary metal-oxide-semiconductor (CMOS) image sensor when a negative voltage is applied to a boron-doped polycrystalline silicon (polysilicon) device. In accordance with an exemplary embodiment, a negative charge pump including at least two stages may apply a first voltage +VDDA to a first n-well NW1, −VDDA to a first pocket p-well PW1, GND to a second n-well NW2, and −2*VDDA to a second pocket p-well PW2, for example.

Figure 1:
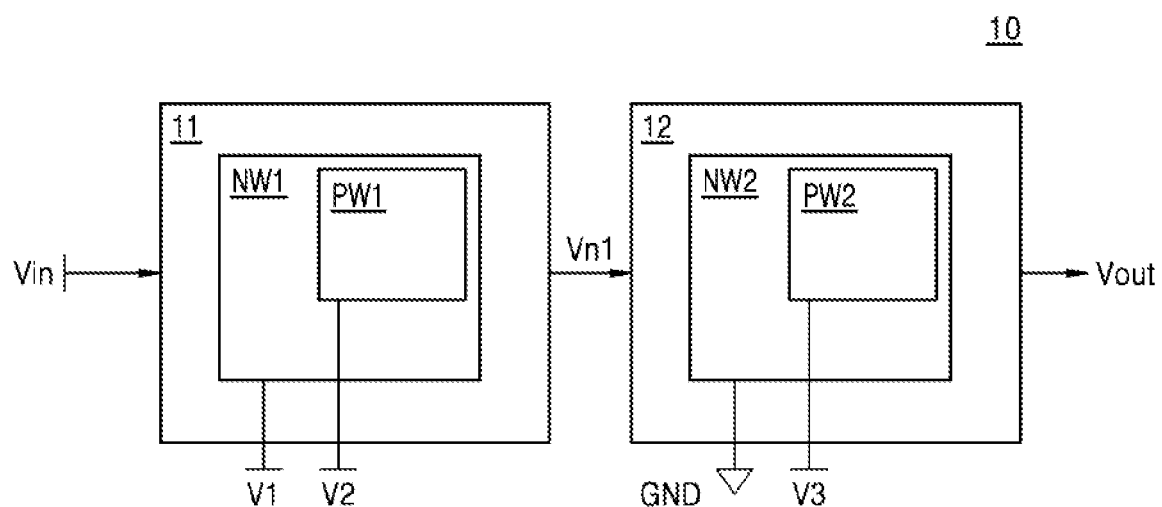
FIG. 1 is a block diagram of a charge pump device according to an exemplary embodiment of the present disclosure.

FIG. 1 illustrates a charge pump device 10 according to an exemplary embodiment of the present disclosure. In accordance with an exemplary embodiment, the charge pump device 10 may include a first stage 11 and a second stage 12.

According to this exemplary embodiment, an input voltage Vin may be input to the first stage 11. In accordance with an exemplary embodiment, the input voltage Vin may be a clock signal, but it is not limited thereto. In accordance with an exemplary embodiment, the clock signal is a periodic signal that has different voltage levels. The input voltage Vin may be a square or substantially square wave that changes between a first voltage V1 and a ground voltage GND.

It shall be understood that a true square wave is a non-sinusoidal periodic waveform in which the amplitude alternates at a steady frequency between fixed minimum and maximum values, with the same duration at minimum and maximum where the transitions between minimum and maximum are theoretically instantaneous. For the purposes of the present disclosure, a substantially square wave is a non-sinusoidal periodic waveform in which the amplitude alternates between fixed minimum and maximum values, which are collectively maintained for a majority of each period.

In accordance with an exemplary embodiment, the first stage 11 may output a first node voltage Vn1. The first node voltage Vn1 may be a different square wave signal than the input voltage Vin. The first node voltage Vn1 may be a square wave signal that changes between the ground voltage GND and a second voltage V2, which is different from the first voltage V1.

The first node voltage Vn1 may be input to the second stage 12. The second stage 12 may output an output voltage Vout. the output voltage Vout may have a substantially constant voltage value. For example, the output voltage Vout may be substantially equal to a third voltage V3.

In accordance with an exemplary embodiment, the first stage 11 may include a first outer well NW1 and a first inner well PW1. The first inner well PW1 may be formed in the first outer well NW1. In accordance with an exemplary embodiment, the first outer well NW1 may have a conductivity type opposite to that of the first inner well PW1. For example, when the first outer well NW1 has an n-type conductivity, the first inner well PW1 may have a p-type conductivity. In another example, when the first outer well NW1 has a p-type conductivity, the first inner well PW1 may have an n-type conductivity. Hereinafter, for convenience of description, it is assumed that the first outer well NW1 has n-type conductivity and the first inner well PW1 has p-type conductivity. However, it shall be understood that based on the description herein, one of ordinary skill in the pertinent art will be able to easily implement a charge pump device in which the first outer well NW1 has p-type conductivity and the first inner well PW1 has n-type conductivity, in a manner similar to that described herein.

Continuing now with the example where the first outer well NW1 has an n-type conductivity and the first inner well PW1 has a p-type conductivity, a voltage applied to the first outer well NW1 may be different from a voltage applied to the first inner well PW1. The first voltage V1 may be applied to the first outer well NW1. The second voltage V2, which is different from the first voltage V1, may be applied to the first inner well PW1. In some examples, the second voltage V2 may have opposite polarity to the first voltage V1.

In accordance with an exemplary embodiment, the second stage 12 may include a second outer well NW2 and a second inner well PW2. The second inner well PW2 may be formed in the second outer well NW2. In accordance with an exemplary embodiment, the second outer well NW2 may have a conductivity type opposite to that of the second inner well PW2. For example, when the second outer well NW2 has n-type conductivity, the second inner well PW2 may have p-type conductivity. In another example, when the second outer well NW2 has p-type conductivity, the second inner well PW2 may have n-type conductivity.

In accordance with an exemplary embodiment, a voltage applied to the second outer well NW2 may be different from a voltage applied to the first outer well NW1. The ground voltage GND may be applied to the second outer well NW2. In accordance with an exemplary embodiment, the ground voltage GND is a reference point for other potentials and may be defined as having an electric potential energy of 0 V. However, embodiments are not limited thereto, and a voltage higher than the ground voltage GND, e.g., a voltage equal to or higher than 1 V, may be applied to the second outer well NW2.

In accordance with an exemplary embodiment, a voltage applied to the second inner well PW2 may be different from a voltage applied to the first inner well PW1. In accordance with an exemplary embodiment, the third voltage V3 may be applied to the second inner well PW2. In accordance with an exemplary embodiment, the third voltage V3 may be substantially double the second voltage V2 but is not limited thereto.

In accordance with an exemplary embodiment, a voltage difference between the first outer well NW1 and the first inner well PW1 may be substantially the same as a voltage difference between the second outer well NW2 and the second inner well PW2, but embodiments are not limited thereto. For example, the voltage difference between the first outer well NW1 and the first inner well PW1 may be different from the voltage difference between the second outer well NW2 and the second inner well PW2. In accordance with an exemplary embodiment, the voltage difference between the second outer well NW2 and the second inner well PW2 may be greater than the voltage difference between the first outer well NW1 and the first inner well PW1.

Figure 2A:
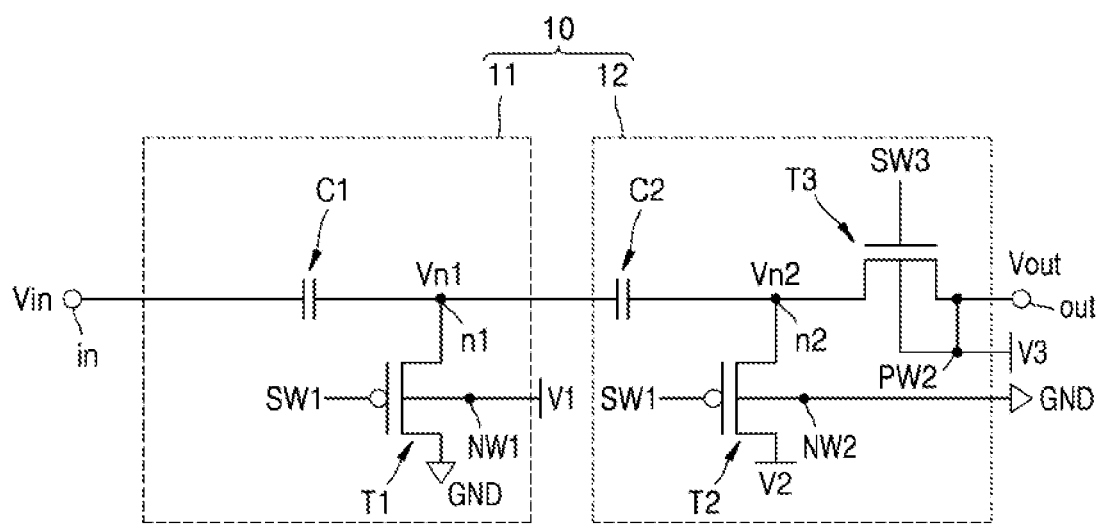
FIGS. 2A and 2B are circuit diagrams of charge pump devices according to an exemplary embodiment of the present disclosure.
Figure 2B:
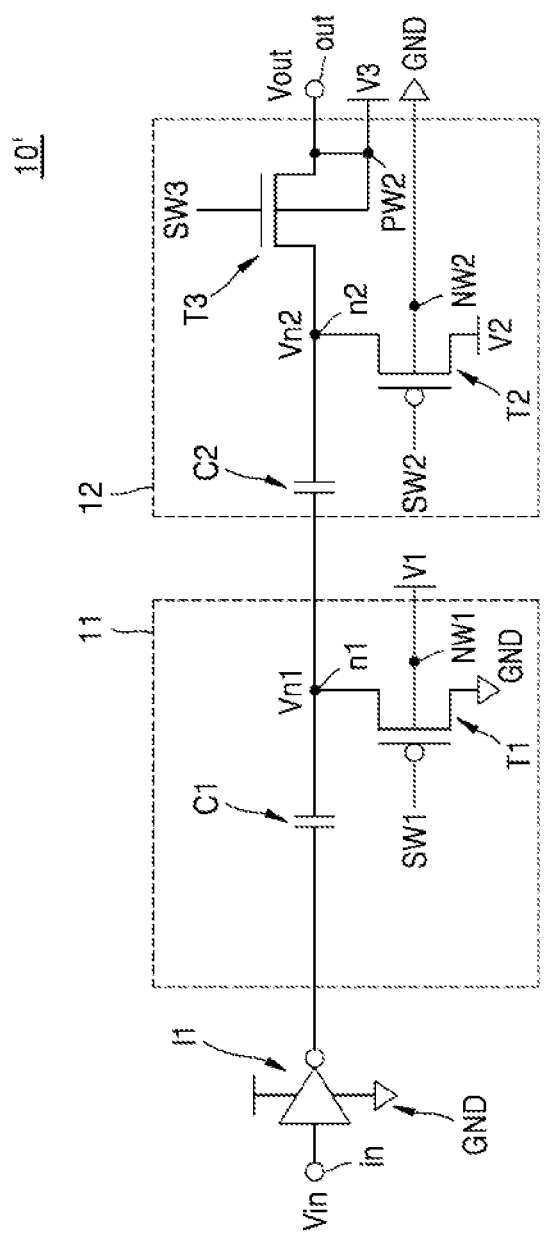
Figure 10:
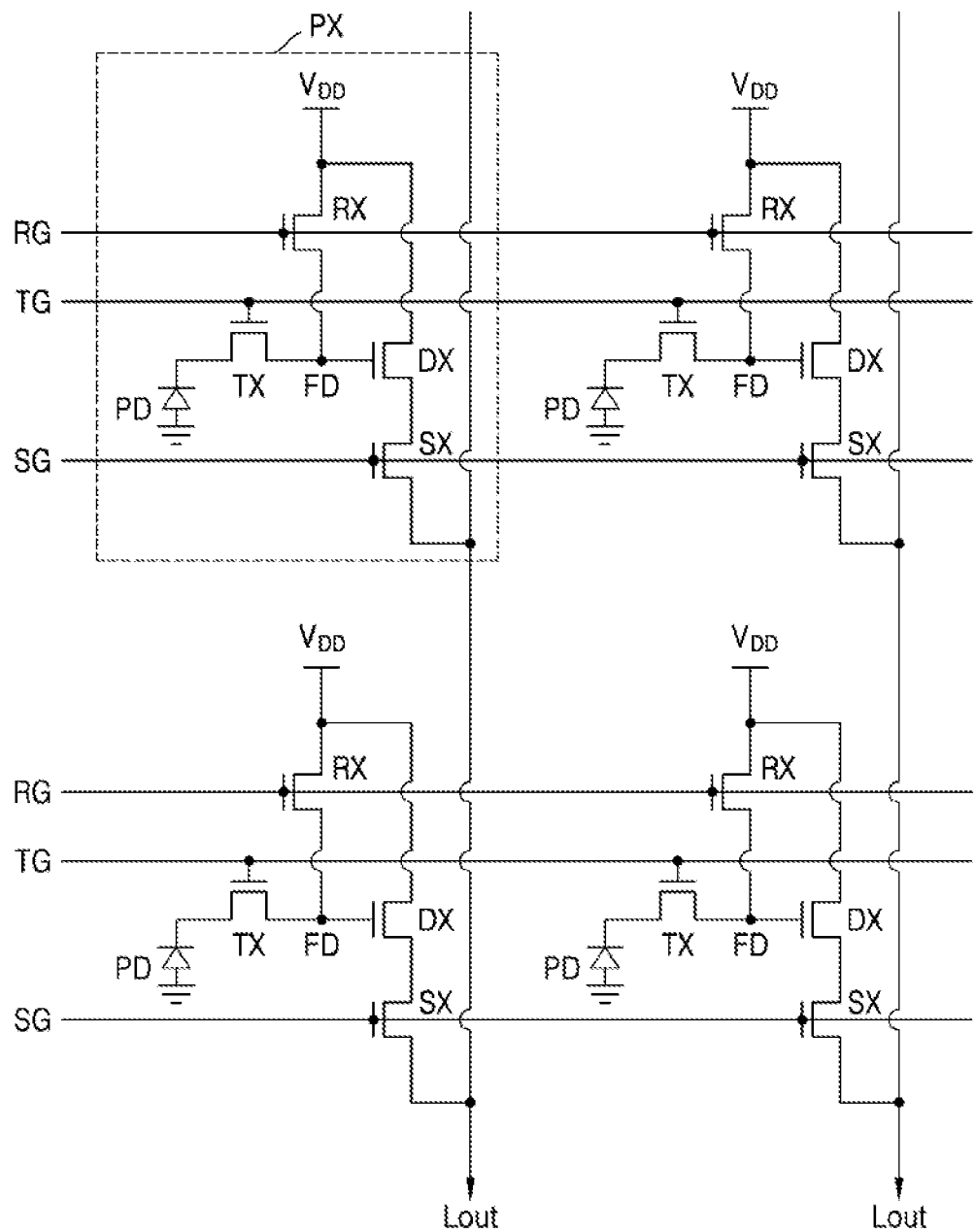
FIG. 10 is a circuit diagram for explaining a pixel included in an image sensor, according to an exemplary embodiment of the present disclosure.

FIGS. 2A and 2B illustrate circuits of charge pump devices 10 of FIGS. 1 and 10', respectively. Where the charge pump 10' of FIG. 2B may be substantially similar to the charge pump 10 of FIG. 2A, duplicate description may be omitted.

Referring to FIG. 2A, the first stage 11 may include a first capacitor C1 and a first transistor T1, and the second stage 12 may include a second capacitor C2, a second transistor T2, and a third transistor T3.

In accordance with an exemplary embodiment, the first and second transistors T1 and T2 may include a p-type metal-oxide-semiconductor field-effect transistor (MOSFET). In accordance with an exemplary embodiment, the third transistor T3 may include an n-type MOSFET.

In accordance with an exemplary embodiment, a first terminal of the first capacitor C1 may be connected to an input terminal "in". In accordance with an exemplary embodiment, the input voltage Vin may be applied to the first terminal of the first capacitor C1. In accordance with an exemplary embodiment, the first transistor T1 may be connected to a second terminal of the first capacitor C1. A node connected to the second terminal of the first capacitor C1 and the first transistor T1 is defined as a first node n1, and a potential difference between the first node n1 and the ground voltage GND is defined as a first node voltage Vn1.

In accordance with an exemplary embodiment, at least a portion of the first outer well NW1 may form a body of the first transistor T1. In accordance with an exemplary embodiment, the first voltage V1 may be applied to the first outer well NW1. As a control signal, a first switch signal SW1 may be applied to a gate (or a control electrode) of the first transistor T1. A first electrode of the first transistor T1 may be connected to the second terminal of the first capacitor C1 at the first node n1, and the ground voltage GND may be applied to a second electrode of the first transistor T1.

A first terminal of the second capacitor C2 may be connected to the second terminal of the first capacitor C1. The first terminal of the second capacitor C2 may be connected to the first node n1. The first node voltage Vn1 may be applied to the first terminal of the second capacitor C2. The second and third transistors T2 and T3 may be connected to a second terminal of the second capacitor C2.

A node connected to the second terminal of the second capacitor C2 and the second and third transistors T2 and T3 is defined as a second node n2, and a potential difference between a potential of the second node n2 and the ground voltage GND is defined as a second node voltage Vn2.

In accordance with an exemplary embodiment, at least a portion of the second outer well NW2 may form a body of the second transistor T2. The ground voltage GND may be applied to the second outer well NW2. As a control signal, a second switch signal SW2 may be applied to a gate of the second transistor T2. A first electrode of the second transistor T2 may be connected to the second terminal of the second capacitor C2 at the second node n2. In accordance with an exemplary embodiment, the second voltage V2 may be applied to a second electrode of the second transistor T2.

In accordance with an exemplary embodiment, at least a portion of the second inner well PW2 may form a body of the third transistor T3. The third voltage V3 may be applied to the second inner well PW2. As a control signal, a third switch signal SW3 may be applied to a gate of the third transistor T3. A first electrode of the third transistor T3 may be connected to the second terminal of the second capacitor C2 at the second node n2. A second electrode of the third transistor T3 may be connected to an output terminal "out". In accordance with an exemplary embodiment, the second electrode of the third transistor T3 may be connected to a node to which the second inner well PW2 is connected, and therefore, the third voltage V3 may be applied to the second electrode of the third transistor T3.

Referring now to FIG. 2B, the charge pump device 10' may further include an inverter 11 between the input terminal "in" and the first capacitor C1. In accordance with an exemplary embodiment, as operating voltages, the ground voltage GND and the first voltage V1 may be applied to the inverter 11. Next, an output voltage of the inverter 11 may be applied to the first terminal of the first capacitor C1. Thus, the inverter 11 may have high input impedance and high current driving performance. Accordingly, the operating characteristics of the charge pump device 10' may be improved, and reliability may be enhanced.

Figure 3:
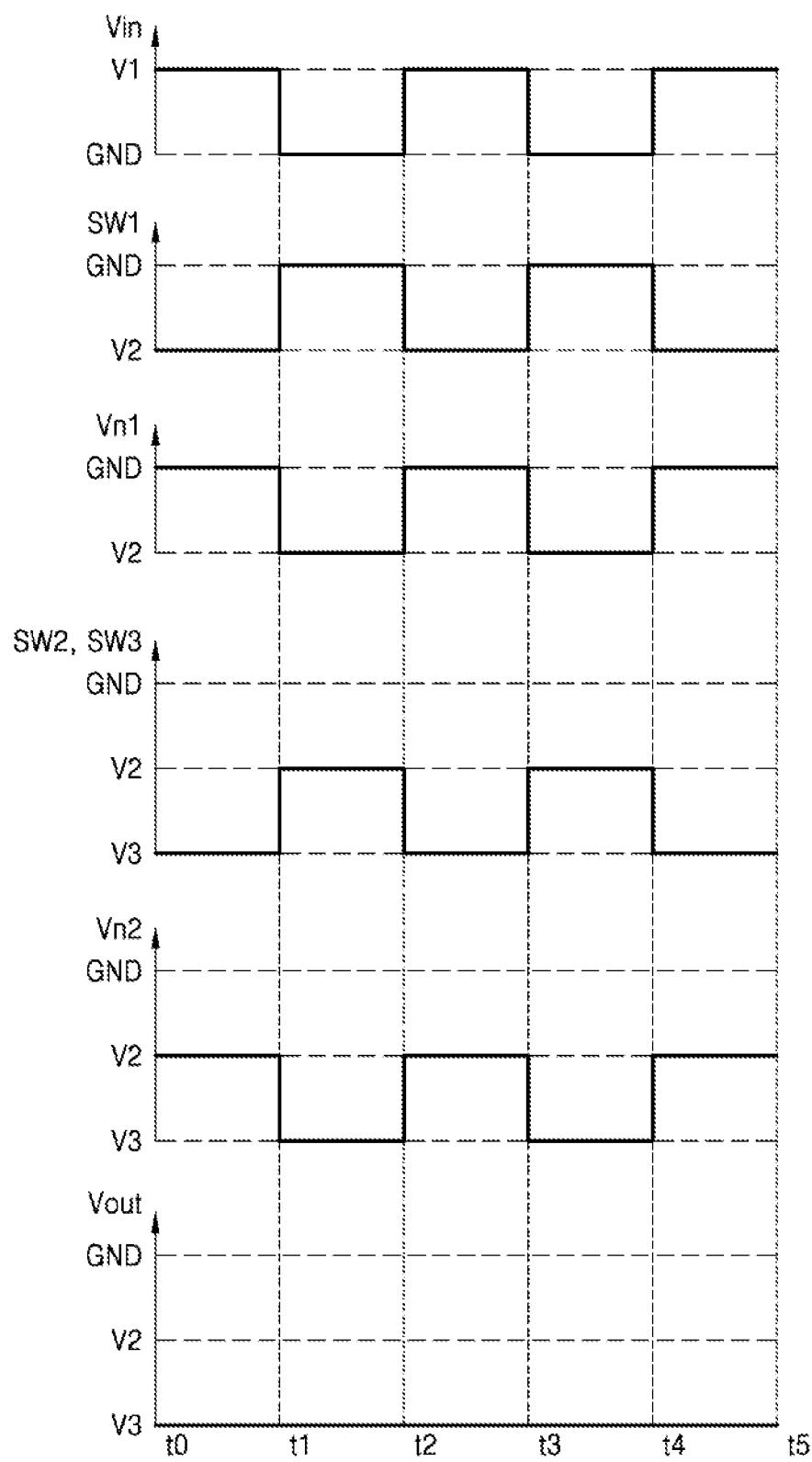
FIG. 3 is a graph for explaining a charge pump device, according to an exemplary embodiment of the present disclosure.

FIG. 3 illustrates a graph for explaining the charge pump device 10 of FIG. 2A. In detail, the graph schematically shows changes in the input voltage Vin, the first and second node voltages Vn1 and Vn2, the first through third switch signals SW1, SW2, and SW3, and the output voltage Vout over time. Although SW2 and SW3 have been shown together in FIG. 3 for ease of description, it shall be understood that each of these control signals may be applied independently to the gates of transistors T2 and T3, respectively.

Referring to FIGS. 2A and 3, the input voltage Vin may be a square-wave signal that changes between the first voltage V1 and the ground voltage GND. The input voltage Vin may periodically change. The input voltage Vin may be maintained at the first voltage V1 from a reference time t0 to a first time t1, from a second time t2 to a third time t3, and from a fourth time t4 to a fifth time t5. The input voltage Vin may be maintained at the ground voltage GND from the first time t1 to the second time t2 and from the third time t3 to the fourth time t4.

Thus, the first node voltage Vn1 may be a square-wave signal that periodically changes between the ground voltage GND and the second voltage V2. The voltage Vn1 may be maintained at the ground voltage GND from a reference time t0 to a first time t1, from a second time t2 to a third time t3, and from a fourth time t4 to a fifth time t5. The voltage Vn1 may be maintained at the second voltage V2 from the first time t1 to the second time t2 and from the third time t3 to the fourth time t4.

Similarly, the second node voltage Vn2 may be a square-wave signal that periodically changes between the second voltage V2 and the third voltage V3. The voltage Vn2 may be maintained at the second voltage V2 from a reference time t0 to a first time t1, from a second time t2 to a third time t3, and from a fourth time t4 to a fifth time t5. The voltage Vn1 may be maintained at the third voltage V3 from the first time t1 to the second time t2 and from the third time t3 to the fourth time t4.

In accordance with an exemplary embodiment, the first through fifth times t1 through t5 may sequentially come after the reference time t0. A period between time-sequentially adjacent times may be constant but is not limited thereto. For example, a period between the reference time t0 and the first time t1, during which the input voltage Vin is maintained at the first voltage V1, may be greater or less than a period between the first time t1 and the second time t2, during which the input voltage Vin is maintained at the ground voltage GND.

In accordance with an exemplary embodiment, when the input voltage Vin is the first voltage V1, the first switch signal SW1 may be the second voltage V2. When the first switch signal SW1 is the second voltage V2, the first transistor T1 may be in an on-state and the first node voltage Vn1 may be substantially equal to the ground voltage GND. Accordingly, a potential difference between the first and second terminals of the first capacitor C1 may be substantially equal to the first voltage V1.

When the input voltage Vin is the first voltage V1, the second switch signal SW2 may be the third voltage V3. When the second switch signal SW2 is the third voltage V3, the second transistor T2 may be in an on-state and the second node voltage Vn2 may be substantially equal to the second voltage V2.

The third switch signal SW3 may be substantially the same as the second switch signal SW2. In accordance with an exemplary embodiment, when the third switch signal SW3 is the third voltage V3, the third transistor T3 may be in an off-state. Accordingly, the output terminal "out" may not be directly connected or short-circuited to the second node n2.

In accordance with an exemplary embodiment, when the input voltage Vin is the ground voltage GND, the first switch signal SW1 may be the ground voltage GND. When the first switch signal SW1 is the ground voltage GND, the first transistor T1 may be in an off-state and the first node voltage Vn1 may be different from the ground voltage GND. In accordance with an exemplary embodiment, a voltage between the first and second terminals of the first capacitor C1 continuously changes, and accordingly, the potential difference between the first and second terminals of the first capacitor C1 may be maintained at the first voltage V1. Accordingly, the first node voltage Vn1 may be substantially equal to the second voltage V2.

When the input voltage Vin is the ground voltage GND, the second switch signal SW2 may be the second voltage V2. When the second switch signal SW2 is the second voltage V2, the second transistor T2 may be in an off-state. In accordance with an exemplary embodiment, a voltage between the first and second terminals of the second capacitor C2 continuously changes, and accordingly, a potential difference between the first and second terminals of the second capacitor C2 may be maintained at the first voltage V1. Accordingly, the second node voltage Vn2 may be substantially equal to the third voltage V3, which is about double the second voltage V2.

In accordance with an exemplary embodiment, when the third switch signal SW3 is the second voltage V2, the third transistor T3 may be in an on-state and the output voltage Vout may be substantially equal to the second node voltage Vn2. Accordingly, the third voltage V3 may be output. Although not shown, a load, e.g., a capacitor, may be connected to the output terminal "out". In this case, the output voltage Vout may be maintained at the third voltage V3 even when the third transistor T3 is in the off-state.

Figure 4:
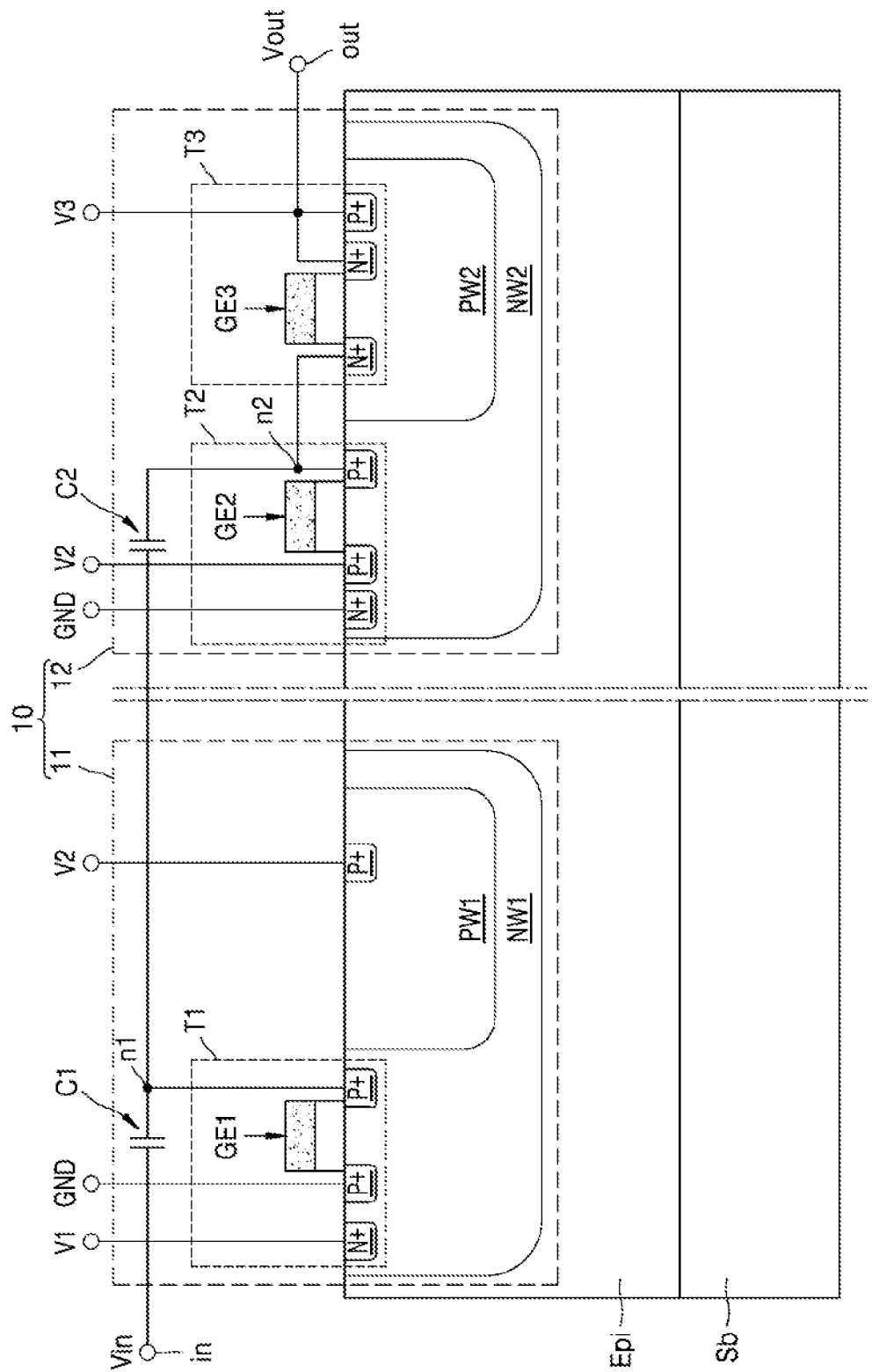
FIGS. 4 through 5C are cross-sectional views of a charge pump device according to an exemplary embodiment of the present disclosure.

FIG. 4 illustrates a cross-sectional view of the charge pump device 10 of FIGS. 1 and 2A.

In accordance with an exemplary embodiment, the charge pump device 10 may include the first and second inner wells PW1 and PW2 and the first and second outer wells NW1 and NW2. The first and second inner wells PW1 and PW2 and the first and second outer wells NW1 and NW2 may be formed in an epitaxial layer Epi on a substrate Sb.

In accordance with an exemplary embodiment, the substrate Sb may include a bulk silicon substrate, a silicon-on-insulator (SOI) substrate, a germanium substrate, a germanium-on-insulator (GOI) substrate, or a silicon germanium substrate but is not limited thereto. In accordance with an exemplary embodiment, the substrate Sb may include one selected from the group consisting of silicon (Si), germanium (Ge), silicon germanium (SiGe), gallium arsenide (GaAs), indium gallium arsenide (InGaAs), aluminum gallium arsenide (AlGaAs), and a mixture thereof.

In accordance with an exemplary embodiment, the substrate Sb may include a doped semiconductor layer. In accordance with an exemplary embodiment, the substrate Sb may be doped with a p-type dopant but is not limited thereto.

In accordance with an exemplary embodiment, the epitaxial layer Epi may include a semiconductor material layer formed through selective epitaxial growth. In accordance with an exemplary embodiment, the epitaxial layer Epi may be doped with a p-type dopant. In accordance with an exemplary embodiment, the epitaxial layer Epi may be doped at a higher concentration than the substrate Sb but is not limited thereto.

In accordance with an exemplary embodiment, the first and second outer wells NW1 and NW2 may be doped with an n-type dopant. In accordance with an exemplary embodiment, the first and second outer wells NW1 and NW2 may be arranged adjacent to each other but are not limited thereto.

In accordance with an exemplary embodiment, the first inner well PW1 may be formed in the first outer well NW1, and the second inner well PW2 may be formed in the second outer well NW2. In accordance with an exemplary embodiment, the first and second inner wells PW1 and PW2 may be doped with a p-type dopant.

In accordance with an exemplary embodiment, p-type regions P+ and an n-type region N+, which are formed in the first outer well NW1, and a first gate electrode GE1 formed on the first outer well NW1 may constitute the first transistor T1. In accordance with an exemplary embodiment, the first switch signal SW1 (in FIG. 2A) may be applied to the first gate electrode GE1.

In accordance with an exemplary embodiment, the p-type regions P+ in the first outer well NW1 may respectively form different electrodes of the first transistor T1. In accordance with an exemplary embodiment, the p-type regions P+ in the first outer well NW1 may be a source and a drain of the first transistor T1.

In accordance with an exemplary embodiment, the n-type region N+ in the first outer well NW1 may be a contact region used to apply a voltage to the body of the first transistor T1. In accordance with an exemplary embodiment, the first voltage V1 may be substantially and constantly applied to the first outer well NW1 through the n-type region N+ in the first outer well NW1.

In accordance with an exemplary embodiment, a p-type region P+ may be formed in the first inner well PW1. In accordance with an exemplary embodiment, the second voltage V2 may be substantially and constantly applied to the first inner well PW1 through the p-type region P+ in the first inner well PW1.

In accordance with an exemplary embodiment, p-type regions P+ and an n-type region N+, which are formed in the second outer well NW2, and a second gate electrode GE2 formed on the second outer well NW2 may constitute the second transistor T2. In accordance with an exemplary embodiment, the second switch signal SW2 (in FIG. 2A) may be applied to the second gate electrode GE2.

In accordance with an exemplary embodiment, the p-type regions P+ in the second outer well NW2 may respectively form different electrodes of the second transistor T2. In accordance with an exemplary embodiment, the p-type regions P+ in the second outer well NW2 may be a source and a drain of the second transistor T2.

In accordance with an exemplary embodiment, the n-type region N+ in the second outer well NW2 may be a contact region used to apply a voltage to the body of the second transistor T2. In accordance with an exemplary embodiment, the ground voltage GND may be substantially and constantly applied to the second outer well NW2 through the n-type region N+ in the second outer well NW2. In accordance with an exemplary embodiment, a potential, e.g., about 1 V, which is higher than the ground voltage GND, may be substantially and constantly applied to the second outer well NW2 through the n-type region N+ in the second outer well NW2.

In accordance with an exemplary embodiment, a p-type region P+ and n-type regions N+, which are formed in the second inner well PW2, and a third gate electrode GE3 formed on second inner well PW2 may constitute the third transistor T3. In accordance with an exemplary embodiment, the n-type regions N+ in the second inner well PW2 may respectively form different electrodes of the third transistor T3. In accordance with an exemplary embodiment, the third switch signal SW3 (in FIG. 2A) may be applied to the third gate electrode GE3.

In accordance with an exemplary embodiment, the n-type regions N+ in the second inner well PW2 may be a source and a drain of the third transistor T3. In accordance with an exemplary embodiment, the p-type region P+ in the second inner well PW2 may be a contact region used to apply a voltage to the body of the third transistor T3. In accordance with an exemplary embodiment, the third voltage V3 may be substantially and constantly applied to the second inner well PW2 through the p-type region P+ in the second inner well PW2.

In accordance with an exemplary embodiment, a voltage difference between the second outer well NW2 and the second inner well PW2 may be substantially the same as a voltage difference between the first outer well NW1 and the first inner well PW1.

In accordance with an exemplary embodiment, the charge pump device 10 may include two stages, i.e., the first stage 11 and the second stage 12, and may apply a lower potential to the second outer well NW2, which is included in the second stage 12, than to the first outer well NW1. Accordingly, even when the third voltage V3, which has a greater absolute value than the second voltage V2, is applied to the second inner well PW2, junction breakdown may be prevented. Accordingly, the charge pump device 10 may have enhanced reliability.

In accordance with an exemplary embodiment, the p-type regions P+ in the first and second stages 11 and 12 may be regions that are doped with a p-type dopant at a high concentration. The n-type regions N+ in the first and second stages 11 and 12 may be regions that are doped with an n-type dopant at a high concentration. In accordance with an exemplary embodiment, the first through third gate electrodes GE1 through GE3 in the first and second stages 11 and 12 may include a structure in which a metal gate is formed on silicon oxide.

In accordance with an exemplary embodiment, the first capacitor C1 and the second capacitor C2 may be formed at the same level as wiring layers, which are formed in a back-end-of-line (BEOL) process and/or a front-end-of-line (FEOL) process. In accordance with an exemplary embodiment, the first capacitor C1 and the second capacitor C2 may be formed using the BEOL process and/or the FEOL process.

Figure 5A:
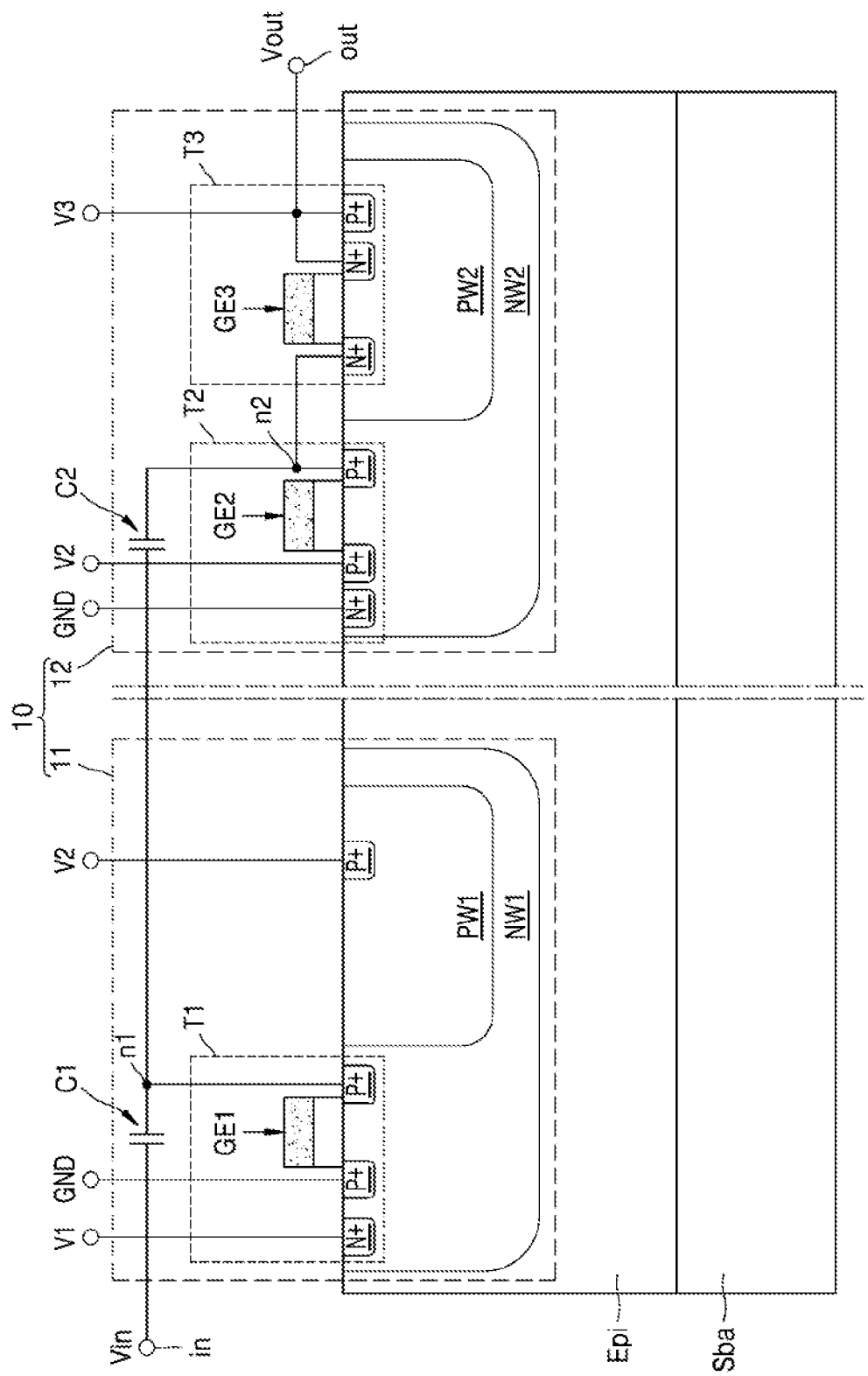
Figure 5B:
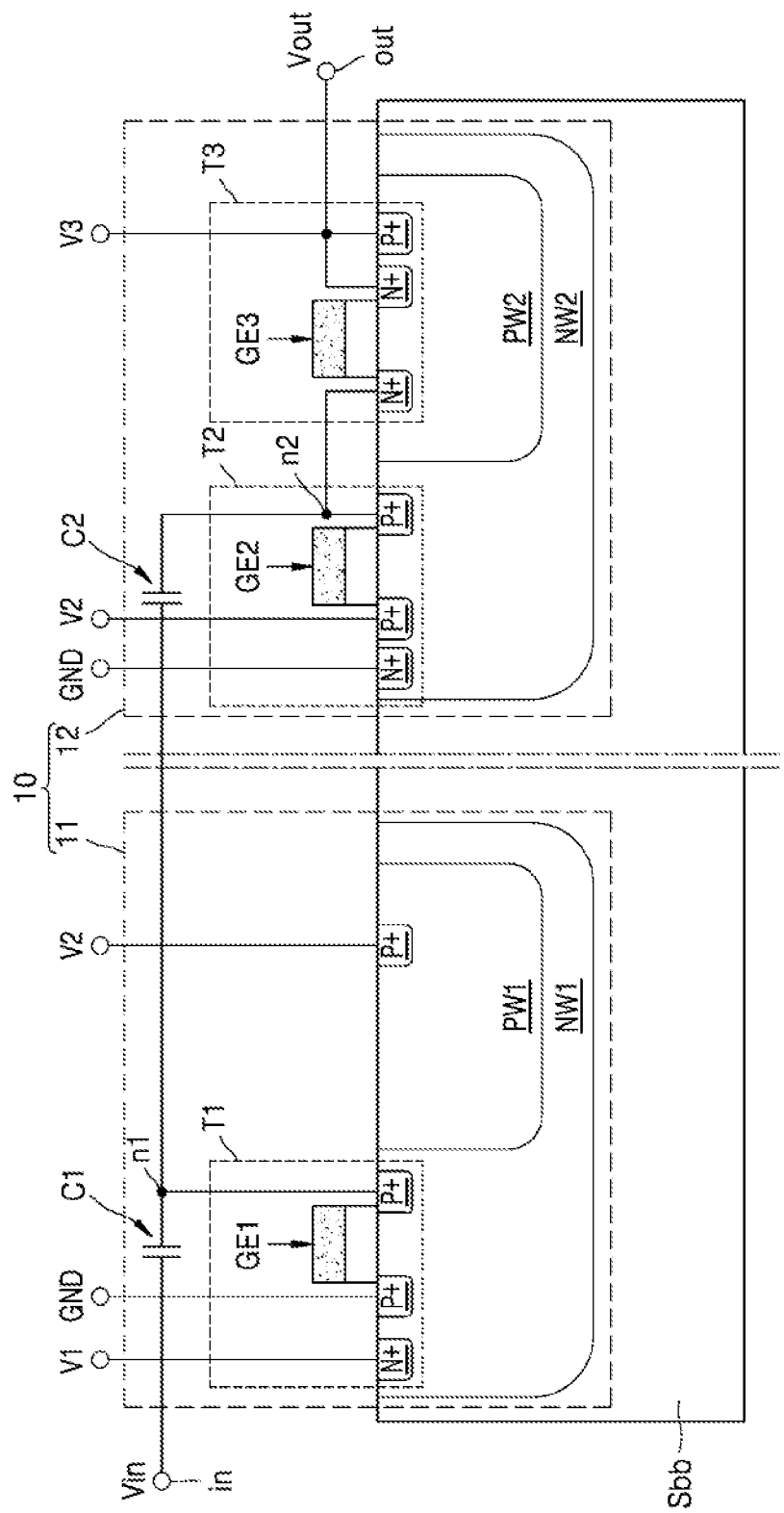

FIGS. 5A through 5C illustrate cross-sectional views of the charge pump device 10 of FIG. 1.

Redundant descriptions with reference to FIG. 4A will be omitted, and descriptions below will be focused on the differences.

Referring to FIG. 5A, the epitaxial layer Epi may be formed on a substrate Sba. In accordance with an exemplary embodiment, the substrate Sba may be doped with an n-type dopant. In accordance with an exemplary embodiment, like the epitaxial layer Epi described above with reference to FIG. 4, the epitaxial layer Epi may be doped with a p-type dopant.

Referring to FIG. 5B, the epitaxial layer Epi may be omitted. Accordingly, the first inner well PW1 and the second inner well PW2 may be formed in a substrate Sbb. In accordance with an exemplary embodiment, the substrate Sbb may be doped with a high-concentration p-type dopant.

Referring to FIG. 5C, the third voltage V4, which is higher than the ground voltage GND, may be applied to the second outer well NW2. In accordance with an exemplary embodiment, a voltage difference between the second outer well NW2 and the second inner well PW2 may be different from a voltage difference between the first outer well NW1 and the first inner well PW1. In accordance with an exemplary embodiment, the voltage difference between the second outer well NW2 and the second inner well PW2 may be greater than the voltage difference between the first outer well NW1 and the first inner well PW1.

Figure 6:
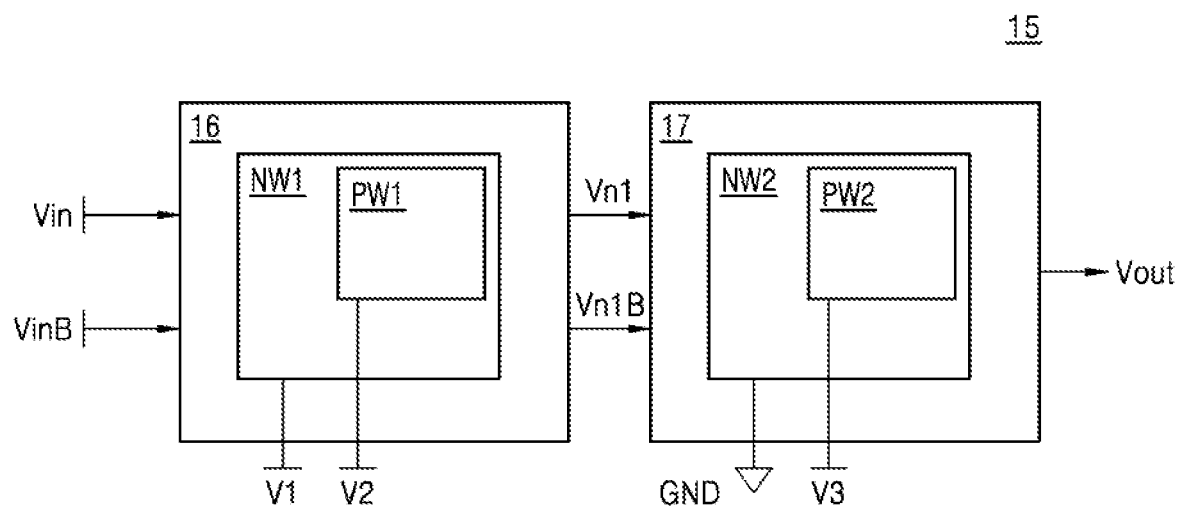
FIG. 6 is a block diagram of a charge pump device according to an exemplary embodiment of the present disclosure.

FIG. 6 illustrates a charge pump device 15 according to an exemplary embodiment of the present disclosure.

In accordance with an exemplary embodiment, the charge pump device 15 may include a first stage 16 and a second stage 17.

In accordance with an exemplary embodiment, the input voltage Vin and a complementary input voltage VinB may be input to the first stage 16. In accordance with an exemplary embodiment, the input voltage Vin in FIG. 6 may be substantially the same as the input voltage Vin described with reference to FIGS. 1 and 3. In accordance with an exemplary embodiment, the complementary input voltage VinB may be a square-wave clock signal that has substantially the same amplitude as the input voltage Vin and an opposite phase to the input voltage Vin.

In accordance with an exemplary embodiment, the first stage 16 may output the first node voltage Vn1 and a third node voltage Vn3 (shown in FIG. 7 as discussed below). The first node voltage Vn1 may be substantially the same as the first node voltage Vn1 described above with reference to FIGS. 1 and 3. In accordance with an exemplary embodiment, the third node voltage Vn3 may be a square-wave signal that has substantially the same amplitude as the first node voltage Vn1 and an opposite phase to the first node voltage Vn1.

In accordance with an exemplary embodiment, the first node voltage Vn1 and the third node voltage Vn3 may be input to the second stage 17. In accordance with an exemplary embodiment, the second stage 17 may output the output voltage Vout. In accordance with an exemplary embodiment, the output voltage Vout may substantially have a constant voltage value. The output voltage Vout may be substantially equal to the third voltage V3.

In accordance with an exemplary embodiment, the first stage 16 may include the first outer well NW1 and the first inner well PW1. The first inner well PW1 and the first outer well NW1 may be substantially the same as the first inner well PW1 and the first outer well NW1, which have been described with reference to FIG. 1.

In accordance with an exemplary embodiment, the second stage 17 may include the second outer well NW2 and the second inner well PW2. The second inner well PW2 and the second outer well NW2 may be substantially the same as the second inner well PW2 and the second outer well NW2, which have been described with reference to FIG. 1.

In an alternate embodiment, a charge pump device 15' may be employed in which the first outer well has p-type conductivity and the first inner well has n-type conductivity.

Figure 7:
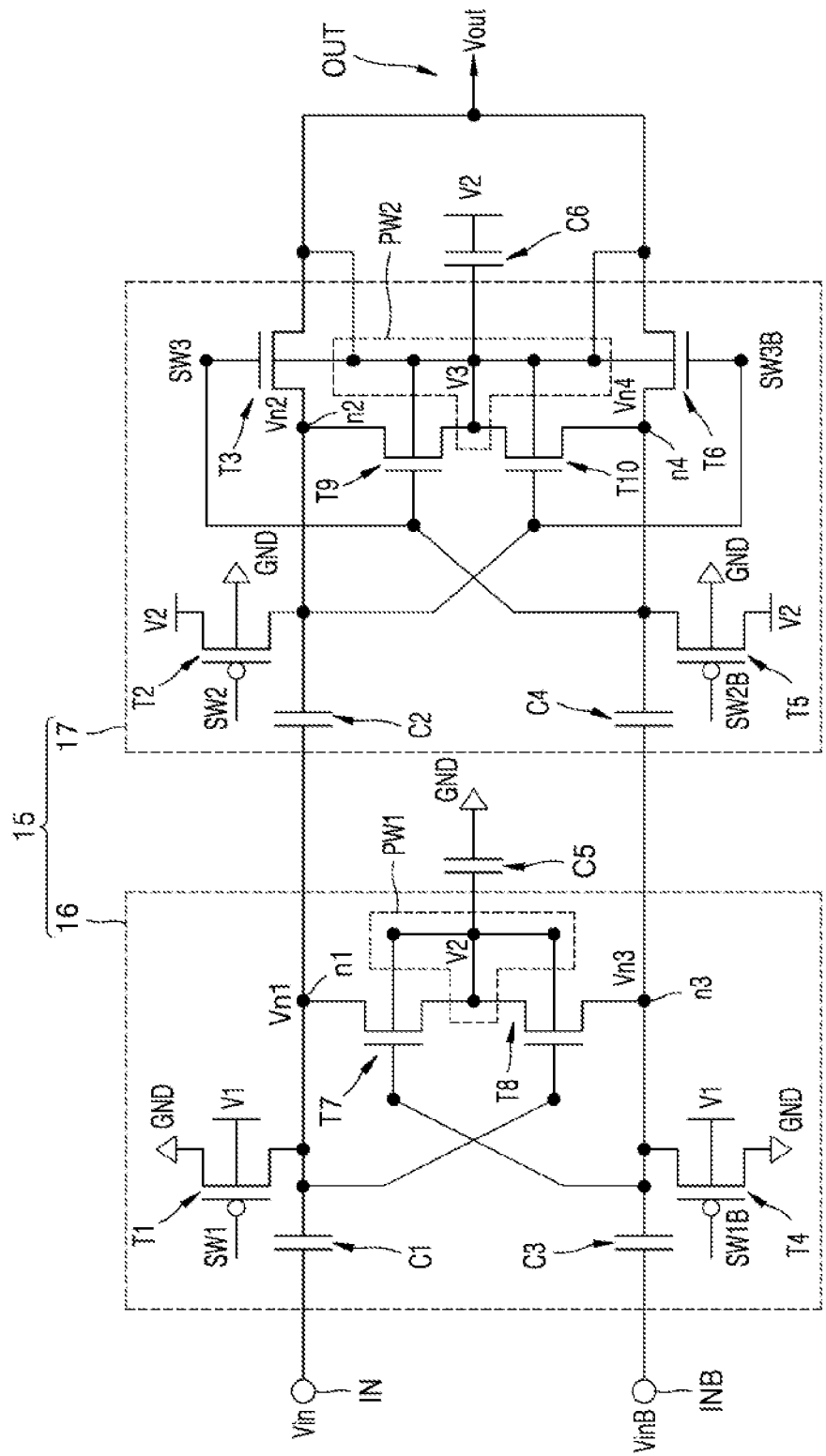
FIG. 7 is a circuit diagram of a charge pump device according to an exemplary embodiment of the present disclosure.

FIG. 7 illustrates a circuit of the charge pump device 15 of FIG. 6.

Referring to FIG. 7, the first stage 16 may include the first capacitor C1, a third capacitor C3, the first transistor T1, a fourth transistor T4, a seventh transistor T7, and an eighth transistor T8. The second stage 17 may include the second capacitor C2, a fourth capacitor C4, the second transistor T2, the third transistor T3, a fifth transistor T5, a sixth transistor T6, a ninth transistor T9, and a tenth transistor T10.

In accordance with an exemplary embodiment, each of the first, second, fourth, and fifth transistors T1, T2, T4, and T5 may be a p-type MOSFET. In accordance with an exemplary embodiment, each of the third transistor T3 and the sixth through tenth transistors T6 through T10 may be an n-type MOSFET.

In accordance with an exemplary embodiment, the connection and operation of the first through third transistors T1, T2, and T3 and the first and second capacitors C1 and C2 are the same as those described with reference to FIG. 2A. In accordance with an exemplary embodiment, a voltage applied to each of the first and second outer wells NW1 and NW2 and the first and second inner wells PW1 and the PW2 is the same as that described with reference to FIG. 2A. In accordance with an exemplary embodiment, the input voltage Vin, the first through third switch signals SW1, SW2, and SW3, and the first and second node voltages Vn1 and Vn2 are the same as those described with reference to FIG. 2A.

The connection and operation of the fourth through sixth transistors T4, T5, and T6 and the third and fourth capacitors C3 and C4 are similar to those of the first through third transistors T1, T2, and T3 and the first and second capacitors C1 and C2.

In detail, a first terminal of the third capacitor C3 may be connected to a complementary input terminal inB. The complementary input voltage VinB may be applied to the first terminal of the third capacitor C3. The fourth transistor T4 may be connected to a second terminal of the third capacitor C3. A node connected to the second terminal of the third capacitor C3 and the fourth transistor T4 is defined as a third node n3, and a potential difference between the third node n3 and the ground voltage GND is defined as a third node voltage Vn3.

In accordance with an exemplary embodiment, at least a portion of the first outer well NW1 may form a body of each of the first transistor T1 and the fourth transistor T4. As a control signal, a first complementary switch signal SW1B may be applied to a gate of the fourth transistor T4. In accordance with an exemplary embodiment, a first electrode of the fourth transistor T4 may be connected to the second terminal of the third capacitor C3 at the third node n3, and the ground voltage GND may be applied to a second electrode of the fourth transistor T4.

In accordance with an exemplary embodiment, at least a portion of the first inner well PW1 may form a body of the seventh transistor T7. As a control signal, the third node voltage Vn3 may be applied to a gate of the seventh transistor T7. A first electrode of the seventh transistor T7 may be connected to the second terminal of the first capacitor C1 at the first node n1, and a second electrode of the seventh transistor T7 may be connected to the first inner well PW1.

In accordance with an exemplary embodiment, at least a portion of the first inner well PW1 may form a body of the eighth transistor T8. As a control signal, the first node voltage Vn1 may be applied to a gate of the eighth transistor T8. A first electrode of the eighth transistor T8 may be connected to the second terminal of the third capacitor C3 at the third node n3, and a second electrode of the eighth transistor T8 may be connected to the first inner well PW1.

In accordance with an exemplary embodiment, a first terminal of the fifth capacitor C5 may be connected to the first inner well PW1. The ground voltage GND may be applied to a second terminal of the fifth capacitor C5. In accordance with an exemplary embodiment, the first node voltage Vn1 and the third node voltage Vn3 may be alternately applied to the first terminal of the fifth capacitor C5. Accordingly, the potential of the first inner well PW1 may be maintained at the second voltage V2.

A first terminal of the fourth capacitor C4 may be connected to the second terminal of the third capacitor C3 at the third node n3. The third node voltage Vn3 may be applied to the first terminal of the fourth capacitor C4. The fifth and sixth transistors T5 and T6 may be connected to a second terminal of the fourth capacitor C4.

A node connected to the second terminal of the fourth capacitor C4 and the fifth and sixth transistors T5 and T6 is defined as a fourth node n4, and a potential difference between the fourth node n4 and the ground voltage GND is defined as a fourth node voltage Vn4.

In accordance with an exemplary embodiment, at least a portion of the second outer well NW2 may form a body of each of the second transistor T2 and the fifth transistor T5. As a control signal, a second complementary switch signal SW2B may be applied to a gate of the fifth transistor T5. A first electrode of the fifth transistor T5 may be connected to the second terminal of the fourth capacitor C4 at the fourth node n4, and the second voltage V2 may be applied to a second electrode of the fifth transistor T5.

In accordance with an exemplary embodiment, at least a portion of the second inner well PW2 may form a body of each of the third transistor T3 and the sixth transistor T6. As a control signal, a third complementary switch signal SW3B may be applied to a gate of the sixth transistor T6. A first electrode of the sixth transistor T6 may be connected to the second terminal of the fourth capacitor C4 at the fourth node n4, and a second electrode of the sixth transistor T6 may be connected to the output terminal "out". In accordance with an exemplary embodiment, the second electrode of the sixth transistor T6 may be connected to a node to which the second inner well PW2 is connected, and therefore, the third voltage V3 may be applied to the second electrode of the sixth transistor T6.

In accordance with an exemplary embodiment, at least a portion of the second inner well PW2 may form a body of the ninth transistor T9. As a control signal, the fourth node voltage Vn4 may be applied to a gate of the ninth transistor T9. A first electrode of the ninth transistor T9 may be connected to the second terminal of the second capacitor C2 at the second node n2, and a second electrode of the ninth transistor T9 may be connected to the second inner well PW2.

In accordance with an exemplary embodiment, at least a portion of the second inner well PW2 may form a body of the tenth transistor T10. As a control signal, the second node voltage Vn2 may be applied to a gate of the tenth transistor T10. A first electrode of the tenth transistor T10 may be connected to the second terminal of the fourth capacitor C4 at the fourth node n4, and a second electrode of the tenth transistor T10 may be connected to the second inner well PW2.

In accordance with an exemplary embodiment, the second inner well PW2 may be further connected to a first terminal of a sixth capacitor C6. The second voltage V2 may be applied to a second terminal of the sixth capacitor C6. The second node voltage Vn2 and the fourth node voltage Vn4 may be alternately applied to the first terminal of the sixth capacitor C6. Accordingly, a voltage at each of the first and second terminals of the sixth capacitor C6 may remain substantially constant, and a potential of the second inner well PW2 may be maintained at the third voltage V3.

According to some embodiments, like the first and second capacitors C1 and C2, the third through sixth capacitors C3 through C6 may be formed using at least one selected from an FEOL process and a BEOL process.

Figure 8:
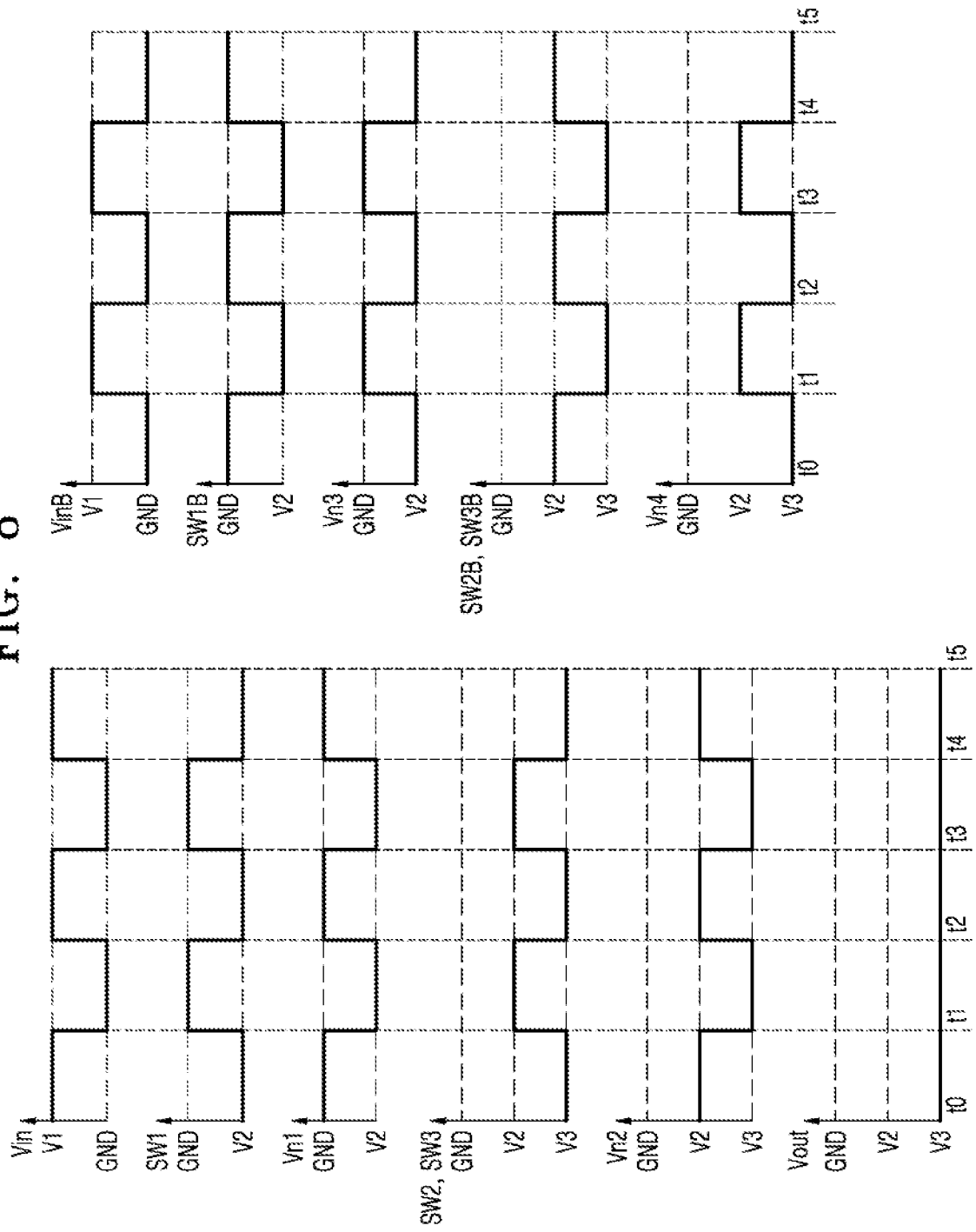
FIG. 8 is a graph for explaining a charge pump device, according to an exemplary embodiment of the present disclosure.

FIG. 8 illustrates a graph for explaining the operation of the charge pump device 15 of FIGS. 6 and 7. In detail, FIG. 8 is a graph showing changes in the input voltage Vin, the complementary input voltage VinB, the first through third switch signals SW1 through SW3, the first through third complementary switch signals SW1B through SW3B, the first through fourth node voltages Vn1 through Vn4, and the output voltage Vout over time.

In accordance with an exemplary embodiment, the input voltage Vin, the first and second node voltages Vn1 and Vn2, and the first through third switch signals SW1 through SW3 are substantially the same as those described with reference to FIG. 3. In accordance with an exemplary embodiment, the operations of the first through third transistors T1 through T3 is substantially the same as those described with reference to FIG. 3.

The complementary input voltage VinB, the third and fourth node voltages Vn3 and Vn4, and the first through third complementary switch signals SW1B through SW3B may be respectively square-wave signals that are respectively complementary to the input voltage Vin, the first and second node voltages Vn1 and Vn2, and the first through third switch signals SW1 through SW3. In accordance with an exemplary embodiment, complementary square-wave signals have the same voltage level as each other and opposite phases to each other.

Accordingly, the operations of the fourth through sixth transistors T4 through T6 may be the same as those of the first through third transistors T1 through T3 but may be delayed by a half cycle. In detail, when the first transistor T1 is in an on- or off-state, the fourth transistor T4 may be in an off- or on-state. In accordance with an exemplary embodiment, when the second transistor T2 is turned on or off, the fifth transistor T5 may be turned off or on. In accordance with an exemplary embodiment, when the third transistor T3 is turned on or off, the sixth transistor T6 may be turned off or on.

When the first node voltage Vn1 is the ground voltage GND and the third node voltage Vn3 is the second voltage V2, the seventh transistor T7 may be in an off-state and the eighth transistor T8 may be in an on-state. Accordingly, the second voltage V2 corresponding to the third node voltage Vn3 may be applied to the first terminal of the fifth capacitor C5.

When the first node voltage Vn1 is the second voltage V2 and the third node voltage Vn3 is the ground voltage GND, the seventh transistor T7 may be in an on-state and the eighth transistor T8 may be in an off-state. Accordingly, the second voltage V2 corresponding to the first node voltage Vn1 may be applied to the first terminal of the fifth capacitor C5.

According to some embodiments, the second voltage V2 is substantially and constantly applied to the second terminal of the fifth capacitor C5 through the first node n1 or the second node n2, and therefore, a potential difference between the first and second terminals of the fifth capacitor C5 may remain constant. Accordingly, the potential of the first inner well PW1 may remain substantially constant at the second voltage V2.

In accordance with an exemplary embodiment, the respective gates of the third and ninth transistors T3 and T9 may be connected to the fourth node n4. Accordingly, the third and ninth transistors T3 and T9 may be controlled by the fourth node voltage Vn4. In accordance with an exemplary embodiment, the respective gates of the sixth and tenth transistors T6 and T10 may be connected to the second node n2. Accordingly, the sixth and tenth transistors T6 and T10 may be controlled by the second node voltage Vn2.

When the second node voltage Vn2 is the second voltage V2 and the fourth node voltage Vn4 is the third voltage V3, the ninth transistor T9 may be in an off-state and the tenth transistor T10 may be in an on-state. Accordingly, the third voltage V3 corresponding to the fourth node voltage Vn4 may be applied to the first terminal of the sixth capacitor C6.

When the second node voltage Vn2 is the third voltage V3 and the fourth node voltage Vn4 is the second voltage V2, the ninth transistor T9 may be in an on-state and the tenth transistor T10 may be in an off-state. Accordingly, the third voltage V3 corresponding to the second node voltage Vn2 may be applied to the first terminal of the sixth capacitor C6.

Accordingly, the second voltage V2 is substantially and constantly applied to the second terminal of the sixth capacitor C6, and therefore, a potential difference between the first and second terminals of the sixth capacitor C6 may remain constant and the potential of the second inner well PW2 may remain substantially constant at the third voltage V3.

In accordance with an exemplary embodiment, the third transistor T3 and the sixth transistor T6 may be connected to the output terminal "out". Accordingly, when the third transistor T3 is in an off-state and the sixth transistor T6 is in an on-state, the third voltage V3 corresponding to the fourth node voltage Vn4, which is complementary to the second node voltage Vn2, may be output as the output voltage Vout. When the third transistor T3 is in an on-state and the sixth transistor T6 is in an off-state, the third voltage V3 corresponding to the second node voltage Vn2 may be output as the output voltage Vout. Accordingly, the output voltage Vout may remain substantially constant at the third voltage V3.

Figure 9:
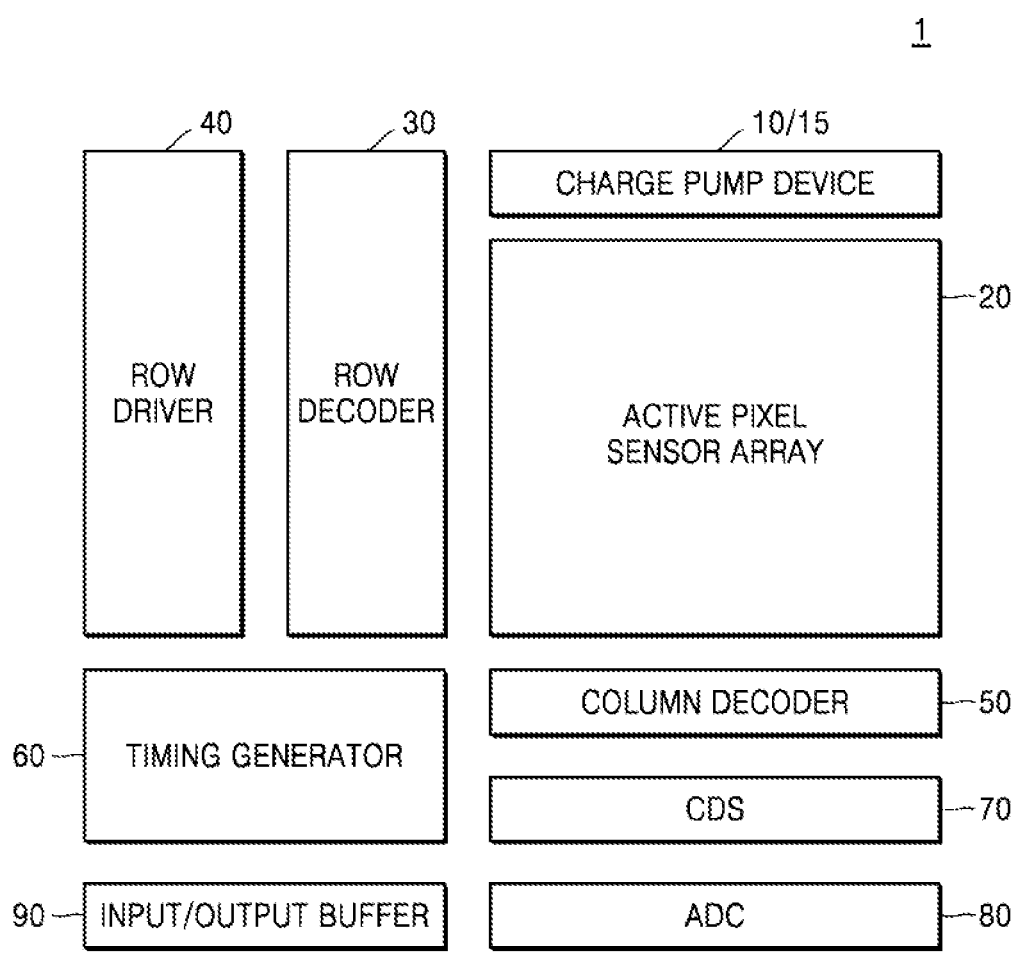
FIG. 9 is a block diagram of an image sensor according to an exemplary embodiment of the present disclosure.

FIG. 9 illustrates an exemplary device layout of an image sensor 1 incorporating either the charge pump device 10 of FIG. 1 or the charge pump device 15 of FIG. 6 according to an exemplary embodiment of the present disclosure.

Referring to FIG. 9, the image sensor 1 may include the charge pump device 10 or 15, an active pixel sensor array 20, a row decoder 30, a row driver 40, a column decoder 50, a timing generator 60, a correlated double sampler (CDS) 70, an analog-to-digital converter (ADC) 80, and an input/output buffer 90.

The active pixel sensor array 20 may include a plurality of pixels arranged in two dimensions. The active pixel sensor array 20 may convert an optical signal into an electrical signal. The active pixel sensor array 20 may be driven by a plurality of drive signals, such as a pixel select signal, a reset signal, and a charge transfer signal, of the row driver 40. An electrical signal generated through conversion by the active pixel sensor array 20 may be provided to the CDS 70.

The row driver 40 may provide the active pixel sensor array 20 with a plurality of drive signals for driving a plurality of pixels according to a decoding result from the row decoder 30. When the pixels included in the active pixel sensor array 20 are arranged in a matrix, the drive signals may be provided to each row.

The timing generator 60 may provide a timing signal and a control signal to the row decoder 30 and the column decoder 50. According to some embodiments, the timing generator 60 may provide an input voltage to the charge pump device 10 or 15.

The CDS 70 may receive an electrical signal from the active pixel sensor array 20 and may hold and sample the electrical signal. The CDS 70 may perform double sampling on a certain noise level and a signal magnitude of an electrical signal and output a differential level corresponding to the difference between the noise level and the signal level.

The ADC 80 may convert an analog signal, which corresponds to a differential level output from the CDS 70, into a digital signal.

The input/output buffer 90 may latch a digital signal and sequentially output a latched digital signal to an image signal processor (not shown) according to a decoding result from the column decoder 50.

In an alternate embodiment, a charge pump device 10" or 15" may be employed in which the first outer well has p-type conductivity and the first inner well has n-type conductivity.

FIG. 10 illustrates a circuit for describing a pixel included in the image sensor of FIG. 9.

Referring to FIGS. 9 and 10, the active pixel sensor array 20 may include a plurality of pixels PX, which may be arranged in a matrix.

In accordance with an exemplary embodiment, a pixel PX may include a transfer transistor TX and logic transistors. In accordance with an exemplary embodiment, the logic transistors may include a reset transistor RX, a select transistor SX, and a drive transistor DX. The transfer transistor TX may include a transfer gate TG, a photoelectric conversion element PD, and a floating diffusion region FD.

The photoelectric conversion element PD may generate and accumulate photocharges in proportion to the amount of incident light. The photoelectric conversion element PD may include a photodiode, a photo transistor, a photo gate, a pinned photodiode (PPD), or a combination thereof. The transfer gate TG may transmit charges accumulated in the photoelectric conversion element PD to the floating diffusion region FD. Photocharges generated in the photoelectric conversion element PD may be stored in the floating diffusion region FD. The drive transistor DX may be controlled by the amount of photocharges accumulated in the photoelectric conversion element PD.

The reset transistor RX may periodically reset the charges accumulated in the floating diffusion region FD. A drain electrode of the reset transistor RX may be connected to the floating diffusion region FD, and a source electrode of the reset transistor RX may be connected to a power supply voltage VDD. When the reset transistor RX is turned on, the power supply voltage VDD connected to the source electrode of the reset transistor RX may be transmitted to the floating diffusion region FD. Accordingly, when the reset transistor RX is turned on, the charges accumulated in the floating diffusion region FD may be discharged, and accordingly, the floating diffusion region FD may be reset.

The drive transistor DX may be combined with a constant current source outside the pixel PX and may thus function as a source follower buffer amplifier. The drive transistor DX may amplify a potential variation in the floating diffusion region FD and output an amplification result to an output line Lout.

The select transistor SX may select pixels PX to be read in each row. When the select transistor SX is turned on, the power supply voltage VDD may be transmitted to a source electrode of the drive transistor DX.

Figure 11:
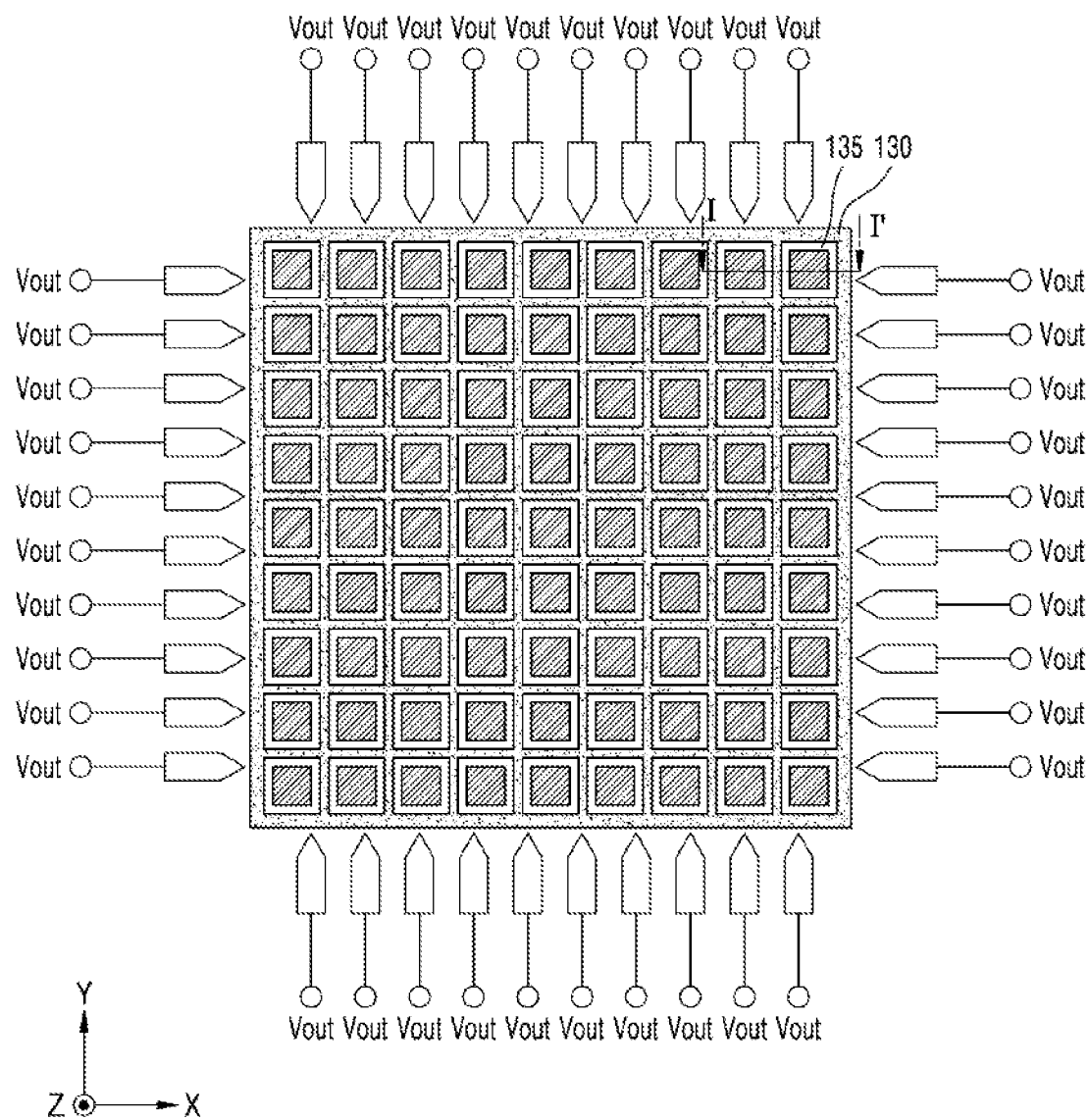
FIG. 11 is a plan view for explaining a pixel included in an image sensor, according to an exemplary embodiment of the present disclosure.

FIG. 11 illustrates a plan view of the image sensor of FIG. 9.

Figure 12:
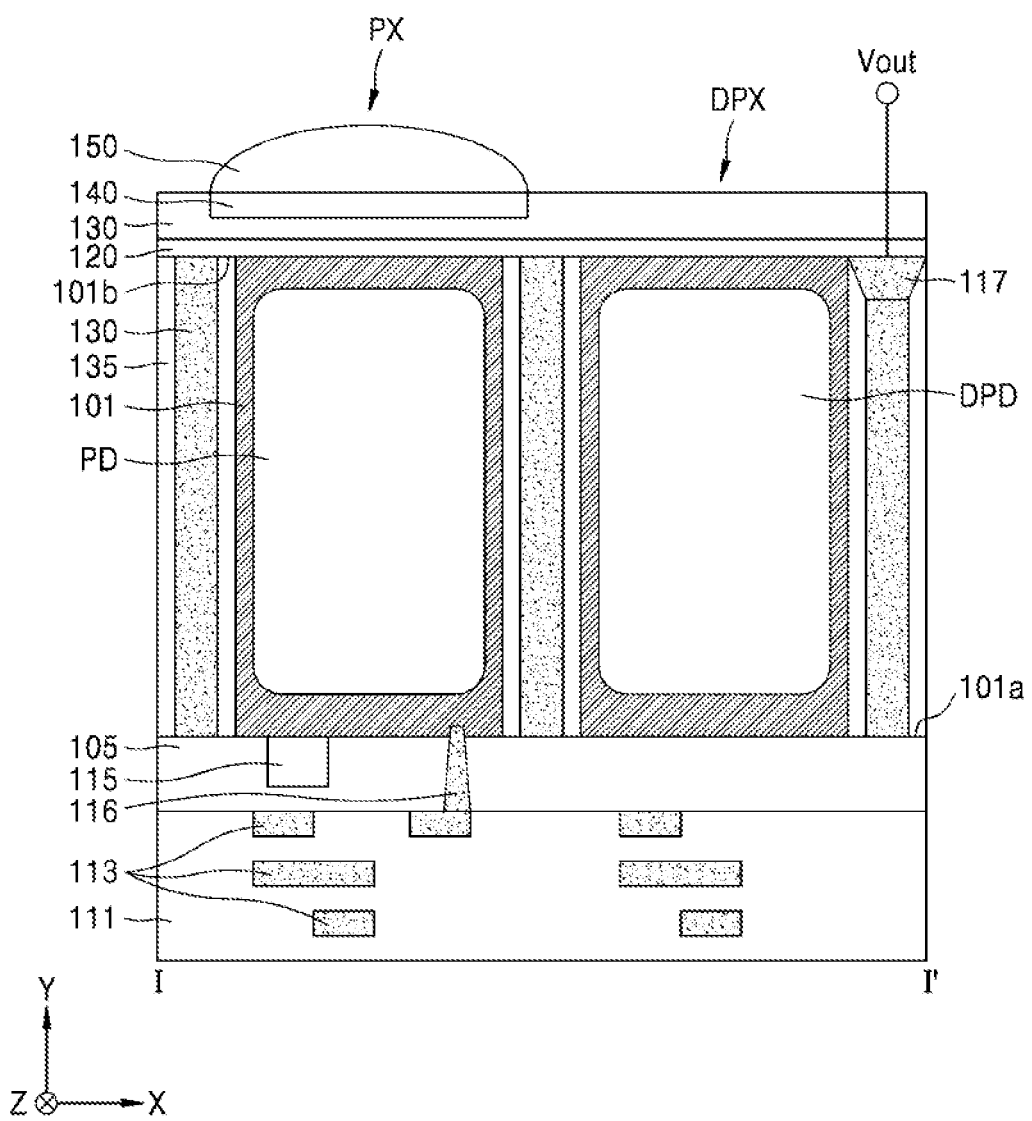
FIG. 12 is a cross-sectional view taken along line I-I' in FIG. 11.

FIG. 12 illustrates a cross-sectional view taken along line I-I' in FIG. 11.

Referring to FIGS. 11 and 12, a substrate 101 may include a first side 101a and a second side 101b, which face each other. The first side 101a may be the front side of the substrate 101, and the second side 101b may be the back side of the substrate 101. The substrate 101 may include the epitaxial layer Epi described with reference to FIGS. 4 and 5A or the substrate Sbb described with reference to FIG. 5B.

Two directions that are substantially parallel with the first side 101a and substantially perpendicular to each other are defined as a first direction, e.g., an X-direction, and a second direction, e.g., a Y-direction, respectively, and a direction substantially perpendicular to the first side 101a is defined as a third direction, e.g., a Z-direction.

Pixels PX and dummy pixels DPX may be formed in the substrate 101. The pixels PX and the dummy pixels DPX may be arranged in a matrix. In accordance with an exemplary embodiment, the pixels PX may be arranged in a central portion of the matrix, and the dummy pixels DPX may be arranged in an edge portion of the matrix. In accordance with an exemplary embodiment, a first isolation film 130 may extend among the pixels PX and the dummy pixels DPX in the first and second directions (e.g., the X- and Y-directions), thereby horizontally isolating each of the pixels PX and the dummy pixels DPX from an adjacent one. In accordance with an exemplary embodiment, a second isolation film 135 may be arranged between the first isolation film 130 and each of the pixels PX and the dummy pixels DPX.

The first isolation film 130 may include a material, e.g., poly-Si, having high gap-filling performance. In accordance with an exemplary embodiment, the first isolation film 130 may be doped with a p-type dopant, e.g., boron (B), but is not limited thereto. According to some embodiments, the first isolation film 130 may have the same length as the substrate 101 in the third direction, e.g., the X-direction, so as to isolate each of the pixels PX and the dummy pixels DPX from an adjacent one.

The second isolation film 135 may include an insulating material. In accordance with an exemplary embodiment, the second isolation film 135 may include a high-permittivity material but is not limited thereto.

The substrate 101 and the first isolation film 130 may function as electrodes and the second isolation film 135 may function as a dielectric layer, thereby forming a capacitor. Accordingly, a voltage difference between the substrate 101 and the first isolation film 130 may substantially remain constant.

In accordance with an exemplary embodiment, a certain potential may be applied to the substrate 101 through a first contact via 116. According to some examples, a potential of the substrate 101 may be a reference potential, i.e., the ground voltage GND (see e.g., FIG. 1), but is not limited thereto.

In accordance with an exemplary embodiment, the output voltage Vout may be applied to the first isolation film 130 through a second contact via 117. In accordance with an exemplary embodiment, the second contact via 117 may be formed along an edge of the first isolation film 130. Referring to FIG. 12, the second contact via 117 is adjacent to the second side 101b, but embodiments are not limited thereto. For example, the second contact via 117 may be adjacent to the first side 101a or to each of the first and second sides 101a and 101b.

According to some embodiments, the first isolation film 130 includes doped poly-Si and may thus have substantially a uniform potential throughout. According to some embodiments, a voltage applied to the first isolation film 130 may be the output voltage Vout that is generated by one of the charge pump devices 10, 10', and 15 described with reference to FIGS. 1 through 7.

In accordance with an exemplary embodiment, an energy barrier between the first isolation film 130 and the substrate 101 may be increased by applying a lower voltage to the first isolation film 130 than to the substrate 101, and accordingly, dark current may be decreased. As a result, the reliability of the image sensor may be enhanced.

In accordance with an exemplary embodiment, the photoelectric conversion element PD and a dummy photoelectric conversion element DPD, e.g., a photodiode, may be formed in the substrate 101. A gate electrode 115 may be arranged on the first side 101a of the substrate 101 to be separated from another one. The gate electrode 115 may be one of, for example, a gate of a charge transfer element, a gate of a reset element, and a gate of a drive element.

Although the gate electrode 115 is arranged on the first side 101a of the substrate 101 in FIG. 12, embodiments are not limited thereto. For example, the gate electrode 115 may be buried in the substrate 101.

An interlayer dielectric film 111 and a front wiring 113 may be formed on the first side 101a of the substrate 101. The front wiring 113 may be covered with the interlayer dielectric film 111. The front wiring 113 may be protected and insulated by the interlayer dielectric film 111.

The interlayer dielectric film 111 may include, for example, silicon oxide, silicon nitride, and/or silicon oxynitride. The front wiring 113 may include, for example, aluminum (Al), copper (Cu), tungsten (W), cobalt (Co), and/or ruthenium (Ru).

The front wiring 113 may include a plurality of wiring layers sequentially stacked on each other. Although the front wiring 113 includes three wiring layers sequentially stacked on each other in FIG. 12, embodiments are not limited thereto.

An insulating film 105 may be arranged between the first side 101a and the interlayer dielectric film 111. The insulating film 105 may cover the gate electrode 115 on the first side 101a.

In accordance with an exemplary embodiment, the insulating film 105 may include an insulating material such as silicon oxide, silicon nitride, or silicon oxynitride.

A passivation film 120 may be arranged on the second side 101b of the substrate 101. In accordance with an exemplary embodiment, the passivation film 120 may be in contact with the second side 101b of the substrate 101. In accordance with an exemplary embodiment, the passivation film 120 may include an amorphous high-k dielectric material but is not limited thereto.

A color filter 150 and a cover insulating layer 140 covering the color filter 150 may be formed on the passivation film 120. The cover insulating layer 140 may include, for example, an oxide film, a nitride film, a low-k dielectric material, and/or resin. In accordance with an exemplary embodiment, the cover insulating layer 140 may include a multi-layer structure.

The color filter 150 may be arranged on the passivation film 120. The color filter 150 may be arranged on the second side 101b of the substrate 101. The color filter 150 may transmit light having a certain wavelength band such that adjacent pixels receive different wavelengths of the light from each other.

A microlens 160 may be arranged on the color filter 150. The microlens 160 may include an organic material, e.g., photosensitive resin, or an inorganic material. The microlens 160 may focus incident light on the pixel PX.

Figure 13:
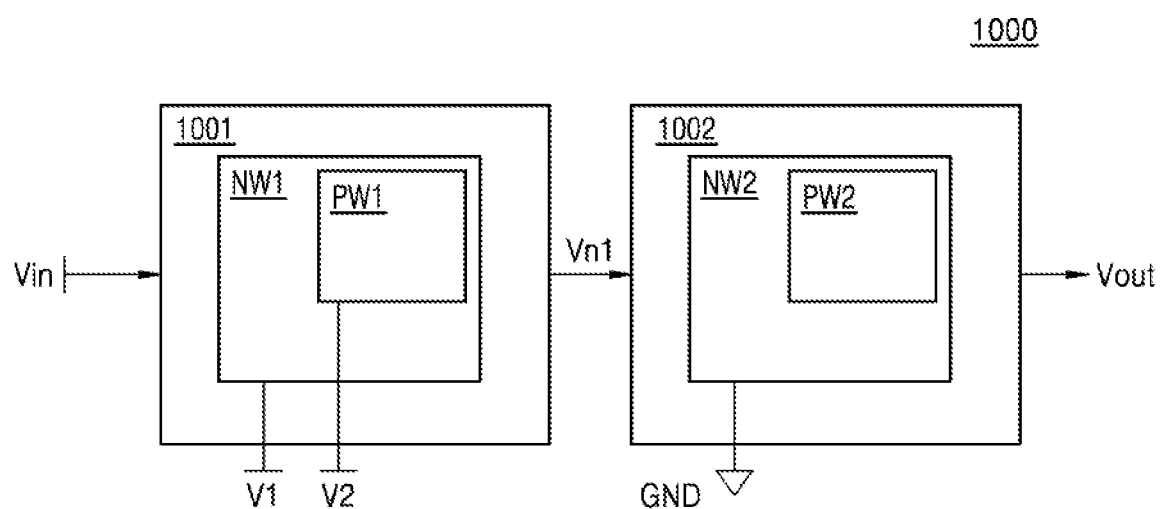
FIG. 13 is a block diagram of a charge pump device according to an exemplary embodiment of the present disclosure.

FIG. 13 illustrates a charge pump device 1000 according to an exemplary embodiment of the present disclosure. Referring to FIG. 13, the charge pump device 1000 may include a first stage 1001 and a second stage 1002.

The first stage 1001 may include the first outer well NW1 and the first inner well PW1 formed in the first outer well NW1. The first stage 1001 is substantially the same as the first stage 11 described with reference to FIG. 1.

The second stage 1002 may include the second outer well NW2 and the second inner well PW2. The second stage 1002 is similar to the second stage 12 in FIG. 1. Hereinafter, the differences between the second stage 1002 and the second stage 12 in FIG. 1 will be described with reference to FIGS. 14 and 15.

Figure 14:
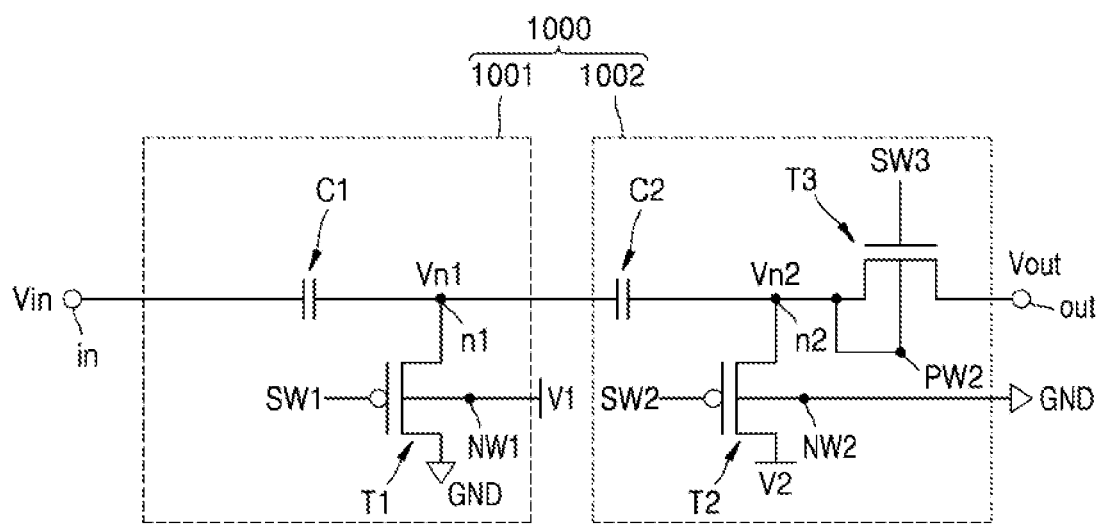
FIG. 14 is a circuit diagram of a charge pump device according to an exemplary embodiment of the present disclosure.
Figure 15:
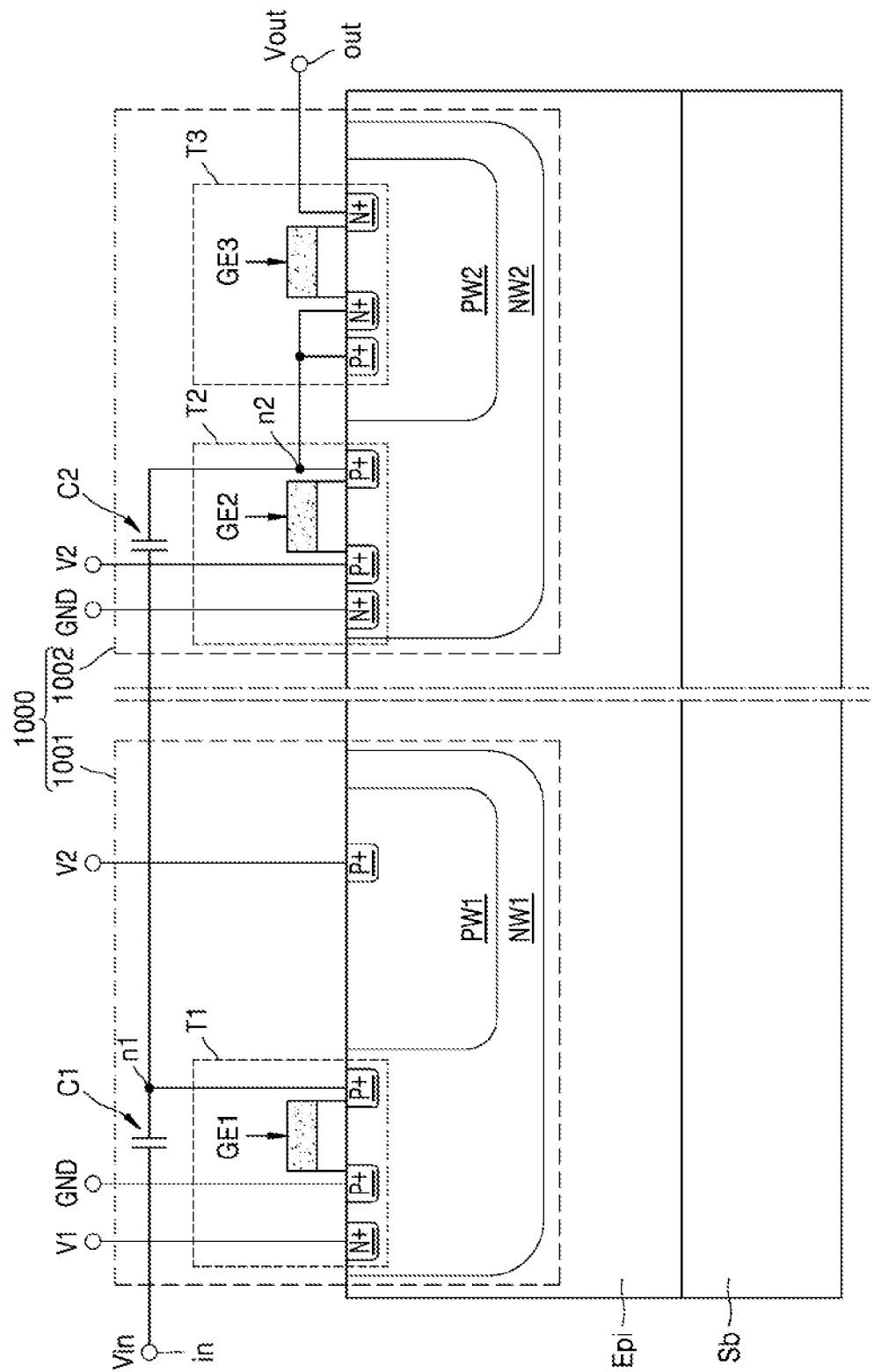
FIGS. 15 through 16C are cross-sectional views of a charge pump device according to an exemplary embodiment of the present disclosure.

FIG. 14 illustrates a circuit of the charge pump device 1000 of FIG. 13. FIG. 15 illustrates a cross-sectional view of the charge pump device 1000 of FIG. 13.

Referring to FIGS. 14 and 15, the first stage 1001 may include the first capacitor C1 and the first transistor T1, and the second stage 1002 may include the second capacitor C2, the second transistor T2, and the third transistor T3.

The first and second transistors T1 and T2 and the first and second capacitors C1 and C2 are substantially the same as those described with reference to FIG. 2A.

The epitaxial layer Epi may be formed on the substrate Sb, and the first and second outer wells NW1 and NW2 may be formed in the epitaxial layer Epi. The first inner well PW1 may be formed in the first outer well NW1, and the second inner well PW2 may be formed in the second outer well NW2.

According to some embodiments, unlike FIGS. 2A and 2B, the body of the third transistor T3 may be electrically connected to the second node n2. Accordingly, the body of the third transistor T3 may be short-circuited to the first electrode of the second transistor T2.

According to some embodiments, a p-type region P+ formed in the second outer well NW2 may be electrically connected to a p-type region P+ formed in the second inner well PW2. Accordingly, the p-type region P+ formed in the second outer well NW2 may be short-circuited to the p-type region P+ formed in the second inner well PW2, and there may be no potential difference therebetween or the potential difference therebetween may be very slight if there is.

Figure 16A:
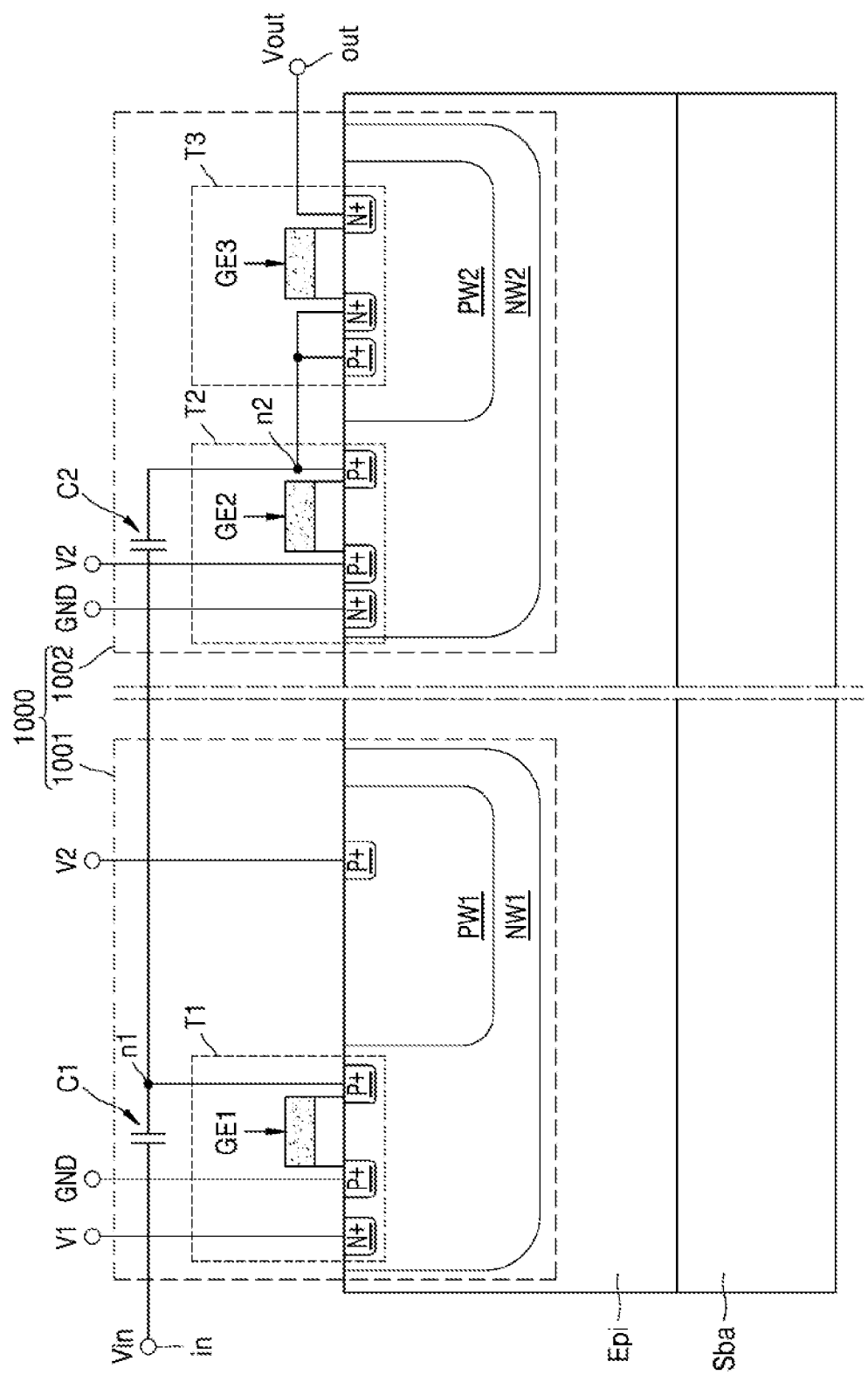
Figure 16B:
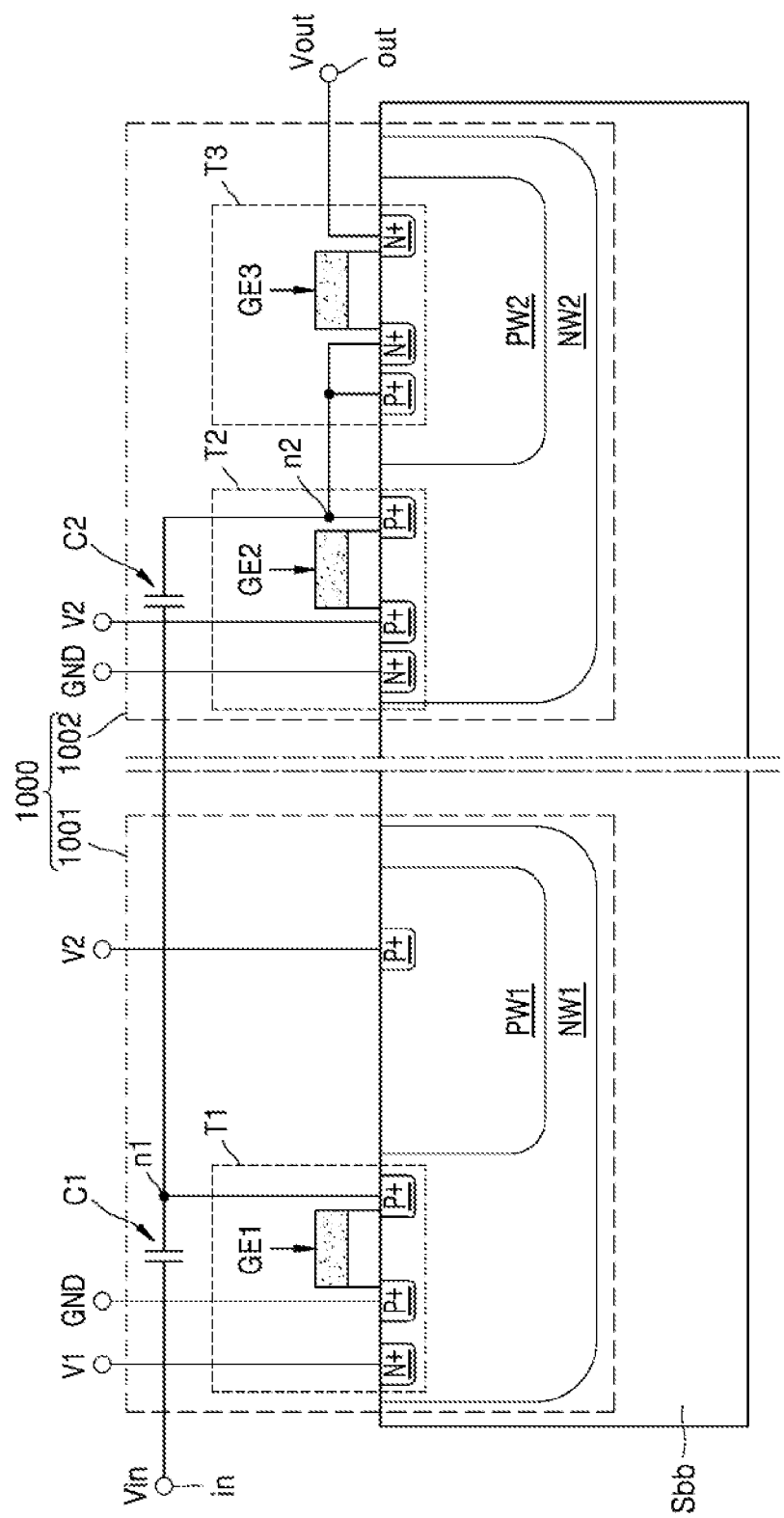
Figure 16C:
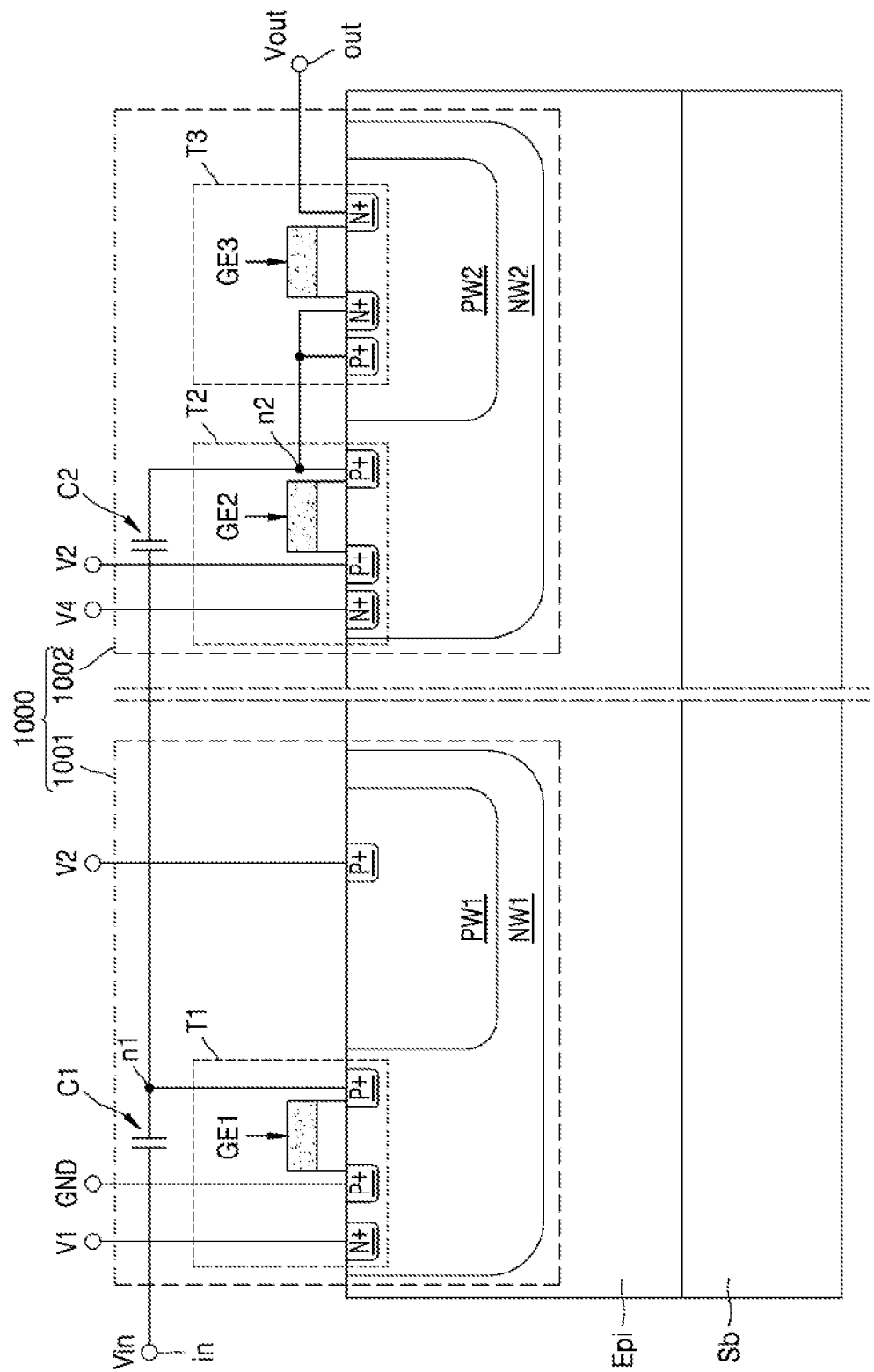

FIGS. 16A through 16C illustrate cross-sectional views of a charge pump device 1000 of FIG. 13 according to alternate examples.

Redundant descriptions that have been made with reference to FIGS. 14 and 15 will be omitted, and descriptions below will be focused on the differences.

Referring to FIG. 16A, the epitaxial layer Epi may be formed on the substrate Sba. In accordance with an exemplary embodiment, the substrate Sba may be doped with an n-type dopant. In accordance with an exemplary embodiment, the epitaxial layer Epi may be doped with a p-type dopant.

Referring to FIG. 16B, the epitaxial layer Epi may be omitted. Accordingly, the first inner well PW1 and the second inner well PW2 may be formed in a substrate Sbb. In accordance with an exemplary embodiment, the substrate Sbb may be doped with a high-concentration p-type dopant.

Referring to FIG. 16C, a fourth voltage V4, which is higher than the ground voltage GND, may be applied to the second outer well NW2. In accordance with an exemplary embodiment, a voltage difference between the second outer well NW2 and the second inner well PW2 may be different from a voltage difference between the first outer well NW1 and the first inner well PW1. In accordance with an exemplary embodiment, the voltage difference between the second outer well NW2 and the second inner well PW2 may be greater than the voltage difference between the first outer well NW1 and the first inner well PW1.

Figure 17:
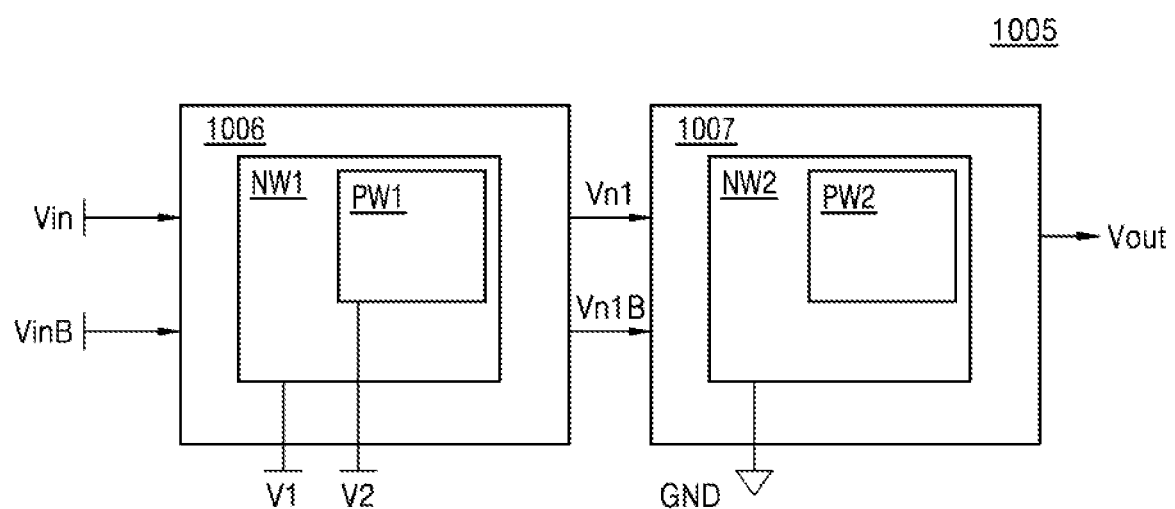
FIG. 17 is a block diagram of a charge pump device according to an exemplary embodiment of the present disclosure.

FIG. 17 illustrates a charge pump device 1005 according to an exemplary embodiment of the present disclosure.

Referring to FIG. 17, the charge pump device 1005 may include a first stage 1006 and a second stage 1007.

The first stage 1006 may include the first outer well NW1 and the first inner well PW1 formed in the first outer well NW1. The first stage 1006 is substantially the same as the first stage 16 described with reference to FIG. 6.

The second stage 1007 may include the second outer well NW2 and the second inner well PW2. The second stage 1007 is similar to the second stage 17 in FIG. 6.

Hereinafter, the differences between the second stage 1007 and the second stage 17 in FIG. 6 will be described with reference to FIG. 18.

Figure 18:
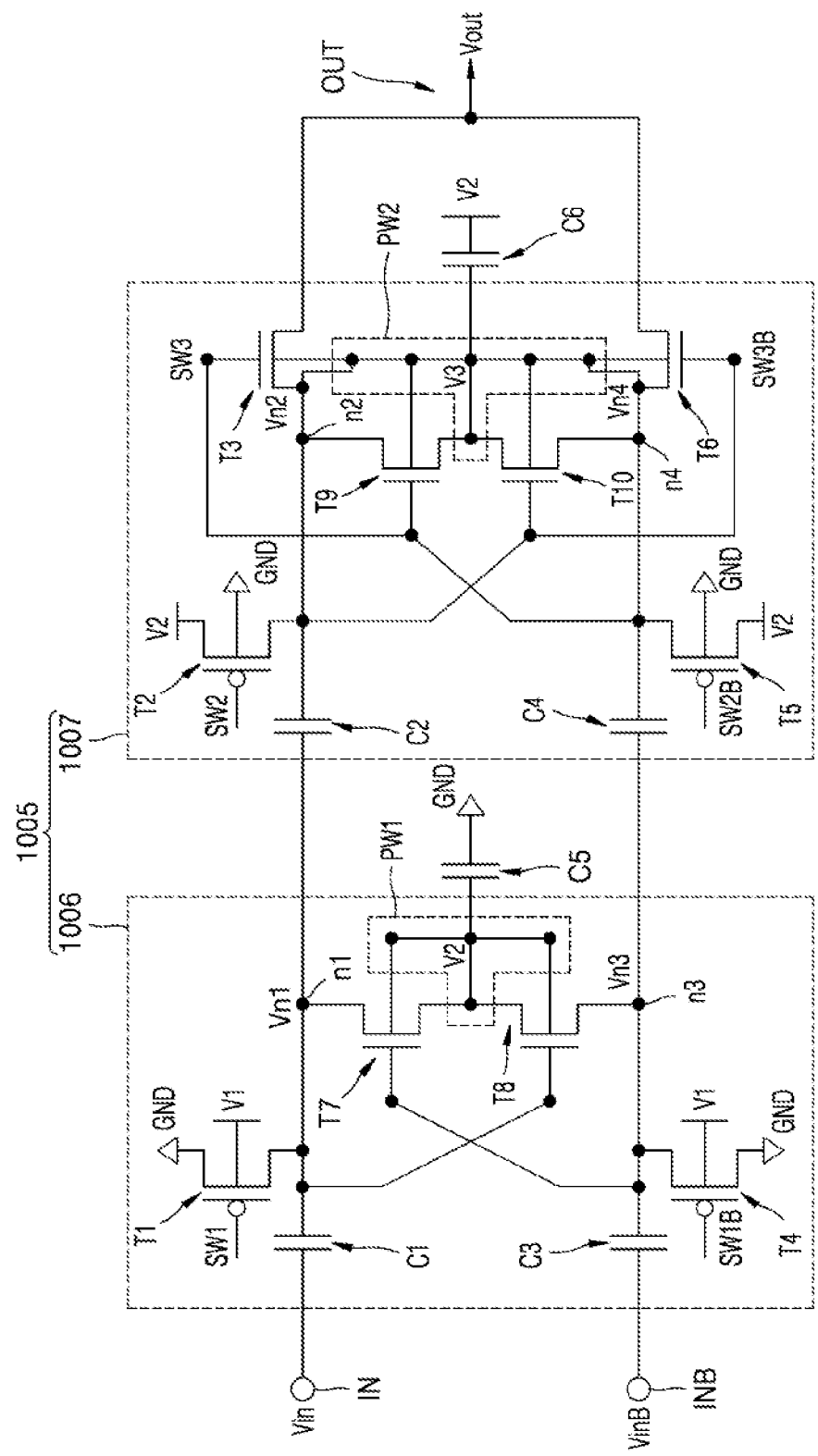
FIG. 18 is a circuit diagram of a charge pump device according to an exemplary embodiment of the present disclosure.

FIG. 18 illustrates a circuit of the charge pump device 1005 of FIG. 17.

The first stage 1006 may include the first transistor T1, the fourth transistor T4, the seventh transistor T7, the eighth transistor T8, the first capacitor C1, the third capacitor C3, and the fifth capacitor C5. The second stage 1007 may include the second transistor T2, the third transistor T3, the fifth transistor T5, the sixth transistor T6, the ninth transistor T9, the tenth transistor T10, the second capacitor C2, the fourth capacitor C4, and the sixth capacitor C6.

The first, second, fourth, fifth, and seventh through tenth transistors T1, T2, T4, T5, and T7 through T10 and the first through fourth capacitors C1 through C4 are substantially the same as those described with reference to FIG. 7.

According to some embodiments, the body of the third transistor T3 may be connected to the second node n2, and the body of the sixth transistor T6 may be connected to the fourth node n4. According to some embodiments, the body of the third transistor T3 may be short-circuited to the first electrode of the second transistor T2 and to the first electrode of the ninth transistor T9. According to some embodiments, the body of the sixth transistor T6 may be short-circuited to the first electrode of the fifth transistor T5 and to the first electrode of the tenth transistor T10.

In an alternate embodiment, a charge pump device 1005' may be employed in which first and second outer wells NW1' and NW2' have a p-type conductivity, while first and second inner wells PW1' and PW2' have an n-type conductivity.

In another alternate embodiment, a charge pump device 1005" may be employed in which a first outer well NW1"

has a p-type conductivity and a first inner well PW1" has an n-type conductivity, while a second outer well NW2" has an n-type conductivity and a second inner well PW2" has a p-type conductivity.

In yet another alternate embodiment, a charge pump device 1005" may be implemented in a semiconductor layer of a first conductivity type, a plurality of outer wells may be implemented in a second conductivity type, and pluralities of inner wells within each outer well may be implemented in the first conductivity type.

While the inventive concept has been particularly shown and described by way of example with reference to exemplary embodiments thereof, it shall be understood that various changes in form and details may be made therein by those of ordinary skill in the pertinent art without departing from the spirit and scope of the present disclosure as set forth in the following claims.

What is claimed is:

1. An image sensor comprising:
   a semiconductor layer of a first conductivity type;
   an isolation film on the semiconductor layer; and
   a charge pump configured to provide an output voltage to the isolation film, the charge pump comprising a first stage and a second stage,
   wherein the first stage is configured to receive an input voltage and configured to generate a first node voltage,
   wherein the second stage is configured to receive the first node voltage and configured to generate the output voltage,
   wherein the first stage comprises,
      a first outer well formed in the semiconductor layer and being of a second conductivity type; and
      a first inner well formed in the first outer well and being of the first conductivity type,
   wherein the second stage comprises,
      a second outer well formed in the semiconductor layer and being of a second conductivity type; and
      a second inner well formed in the second outer well and being of the first conductivity type, and
   wherein the first outer well and the second outer well are spaced apart from each other.

2. The image sensor of claim 1, wherein the isolation film comprises doped polysilicon.

3. The image sensor of claim 1, wherein the isolation film is doped with a P-type dopant.

4. The image sensor of claim 1, wherein the first stage further comprises a first capacitor in which the input signal is applied to a first terminal and a second terminal is connected to the first external well, and
   wherein the second stage comprises a second capacitor having a first terminal connected to the first capacitor and a second terminal connected to the second external well.

5. The image sensor of claim 3, further comprising a plurality of pixels, and
   wherein the isolation film horizontally surrounds each of the plurality of pixels to separate the plurality of pixels from each other.

6. The image sensor of claim 4, wherein the first stage further comprises a first transistor, the first transistor being connected to a second terminal of the first capacitor, and
   wherein the second stage further comprises a second transistor, the second transistor being connected to a second terminal of the second capacitor.

7. The image sensor of claim 6, the second stage further comprises a third transistor connected between the second terminal of the second capacitor and an output terminal.

8. The image sensor of claim 7, wherein a body of the third transistor is connected to the second terminal of the second capacitor.

9. The image sensor of claim 7, wherein a source of the third transistor is connected to a body of the third transistor.

10. The image sensor of claim 7, wherein a drain of the third transistor is connected to the output terminal.

11. An image sensor comprising:
    a semiconductor layer of a first conductivity type;
    an isolation film on the semiconductor layer; and
    a charge pump configured to provide an output voltage to the isolation film, the charge pump comprising a first stage and a second stage,
    wherein the first stage is configured to receive an input voltage and to generate a node voltage,
    wherein the second stage is configured to receive the node voltage and to generate the output voltage,
    wherein the first stage includes a first outer well of the first conductivity type,
    wherein the second stage include a second outer well of the first conductivity type, and
    wherein the first outer well and the second outer well are spaced apart each other.

12. The image sensor of claim 11, wherein the isolation film comprises doped polysilicon.

13. The image sensor of claim 11, wherein the isolation film is doped with a P-type dopant.

14. The image sensor of claim 11, wherein the first stage further comprises a first capacitor in which the input signal is applied to a first terminal and a second terminal is connected to the first external well, and
    wherein the second stage comprises a second capacitor having a first terminal connected to the first capacitor and a second terminal connected to the second external well.

15. The image sensor of claim 13, further comprising a plurality of pixels, and
    wherein the isolation film horizontally surrounds each of the plurality of pixels to separate the plurality of pixels from each other.

16. The image sensor of claim 14, wherein the first stage further comprises a first transistor, the first transistor being connected to a second terminal of the first capacitor, and
    wherein the second stage further comprises a second transistor the second transistor being connected to a second terminal of the second capacitor.

17. The image sensor of claim 16, the second stage further comprises a third transistor connected between the second terminal of the second capacitor and an output terminal.

18. The image sensor of claim 17, wherein a body of the third transistor is connected to the second terminal of the second capacitor.

19. The image sensor of claim 17, wherein a source of the third transistor is connected to a body of the third transistor.

20. The image sensor of claim 17, wherein a drain of the third transistor is connected to the output terminal.

* * * * *